(12) United States Patent
Drzal et al.

(10) Patent No.: US 7,576,147 B2
(45) Date of Patent: Aug. 18, 2009

(54) CELLULOSIC BIOMASS SOY FLOUR BASED BIOCOMPOSITES AND PROCESS FOR MANUFACTURING THEREOF

(75) Inventors: Lawrence T. Drzal, Okemos, MI (US); Amar K. Mohanty, Lansing, MI (US); Wanjun Liu, East Lansing, MI (US); Kelby Thayer, Leslie, MI (US); Manjusri Misra, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 401 days.

(21) Appl. No.: 11/212,241

(22) Filed: Aug. 26, 2005

(65) Prior Publication Data

US 2006/0043629 A1    Mar. 2, 2006

Related U.S. Application Data

(60) Provisional application No. 60/605,112, filed on Aug. 27, 2004.

(51) Int. Cl.
*C08L 89/00* (2006.01)
*C08G 63/08* (2006.01)

(52) U.S. Cl. .............. 524/17; 524/19; 524/25; 524/35; 524/436; 526/238; 530/374

(58) Field of Classification Search .............. 524/17, 524/19, 25, 35, 436; 526/238; 530/378
See application file for complete search history.

(56) References Cited

U.S. PATENT DOCUMENTS

| | | | |
|---|---|---|---|
| 3,615,979 A | 10/1971 | Davis, Sr. et al. | |
| 3,713,927 A | 1/1973 | Peterson et al. | |
| 3,835,212 A | 9/1974 | Piacente | |
| 3,931,095 A | 1/1976 | Kondo et al. | |
| 4,330,443 A * | 5/1982 | Rankin | 527/312 |
| 5,320,699 A | 6/1994 | Clark, Jr. et al. | |
| 5,321,064 A | 6/1994 | Vaidya et al. | |
| 5,446,078 A | 8/1995 | Vaidya et al. | |
| 5,472,511 A | 12/1995 | Rayas et al. | |
| 5,605,577 A | 2/1997 | Rayas et al. | |
| 5,665,152 A | 9/1997 | Bassi et al. | |
| 5,739,244 A * | 4/1998 | Fisk | 524/47 |
| 5,922,379 A * | 7/1999 | Wang | 426/138 |
| 6,045,868 A | 4/2000 | Rayas et al. | |
| 6,231,970 B1 * | 5/2001 | Andersen et al. | 428/332 |
| 2003/0078323 A1 * | 4/2003 | Zhang et al. | 524/17 |
| 2003/0088007 A1 | 5/2003 | Wool et al. | |
| 2003/0100635 A1 * | 5/2003 | Ho et al. | 524/47 |
| 2003/0157268 A1 * | 8/2003 | Gutowski et al. | 427/532 |
| 2003/0220436 A1 * | 11/2003 | Gencer et al. | 524/492 |
| 2005/0154114 A1 * | 7/2005 | Hale | 524/436 |

OTHER PUBLICATIONS

Stokke Kuo, Curry, Gieselman, 6th International Conference on Wood Fiber-Plastic Composites, Madison, 43-53 (2001).
Hassan Kunbargi and Baerbel Schubert, Manufacture of pressed composite building materials, especially insulator boards and lightweight bricks and plates, from hydratable binders and lightweight aggregates and reinforcing materials, PCT Int. Appl. 18 pp. (1994).
Castano, Vazquez-Polo, Amador, Garcia-Zetina, Martinez, Marquez-Amador, Altmamirano-Meza, Journal of Reinforced Plastics and Composites 14(8), 866-888 (1995).
Wu, Q., et al., Polymer, 44 3901-3908 (2003).
Ly, Y. T.-P., et al., Soy protein as biopolymer, In Biopolymers from Renewable Resources, editor(s): Kaplan, David L. 144-176 (1998).
Chen, Y., et al., Polymeric Materials Science and Engineering 88, 455-456 (2003).
Kumar, R., et al., Polymeric Materials Science and Engineering 89, 233-234 (2003).
Otaigbe, J.U., et al., Journal of Elastomers and Plastics 31, 56-71 (1999).
Mohanty, A.K., et al., Macromol. Mater. Eng. 276/277 (2000).
Mohanty, A.K., et al., J. Polymer Env. 10 (1/2) 19 (2002).
B. Van Voorn, et al., Composites: Part A: Natural Fiber Reinforced Sheet Moulding Compound 32 1271-1279 (2001).
Goswami, D.N., et al., Popular Plastics & Packaging, 48(3), 68-71 (2003).
Mishra et al., Journal of Reinforced Plastics and Composites, vol. 20, No. 4, 321-334 (2001).

* cited by examiner

*Primary Examiner*—Vasu Jagannathan
*Assistant Examiner*—Gennadiy Mesh
(74) *Attorney, Agent, or Firm*—Ian C. McLeod

(57) ABSTRACT

A process for the manufacture of natural fiber and polymer composites is described. Thermoplastically processed plasticized soy flour based plastics are used with thermoplastic polymers. Polymers of soy flour and an in situ polymerized polyvinyl polymer which links proteins and carbohydrates in the flour to form the polymer are used. The composites are useful in engineering materials.

14 Claims, 14 Drawing Sheets

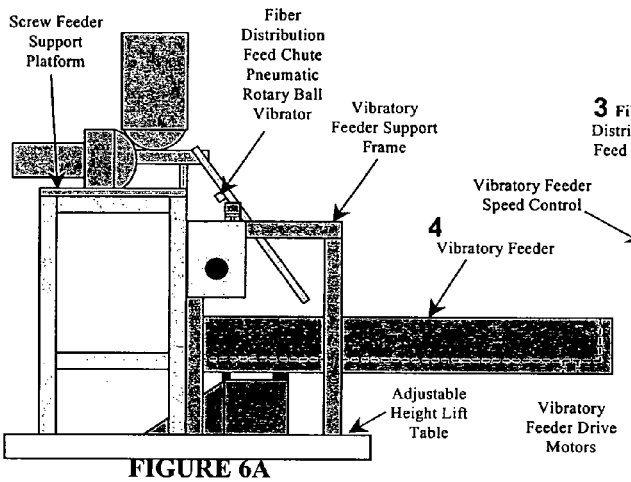
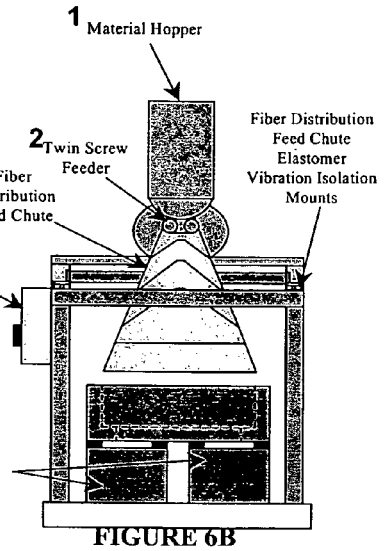
FIGURE 6A
FIGURE 6B
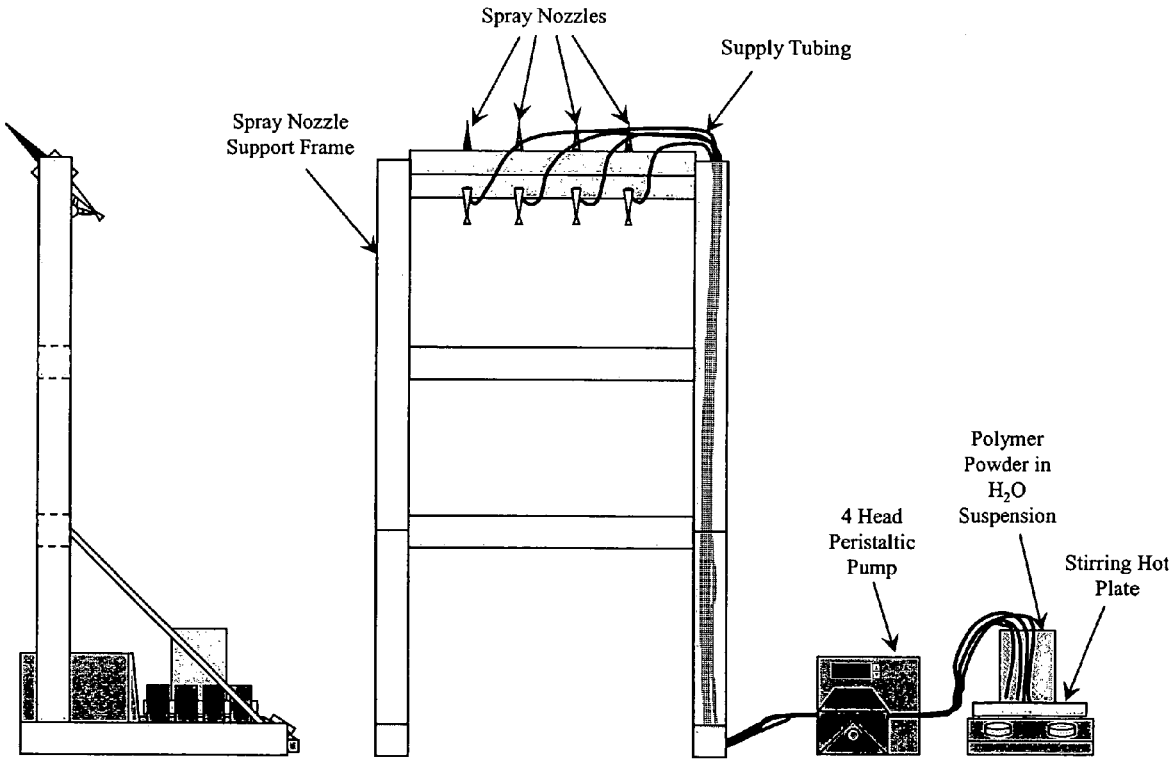
FIGURE 7A
FIGURE 7B

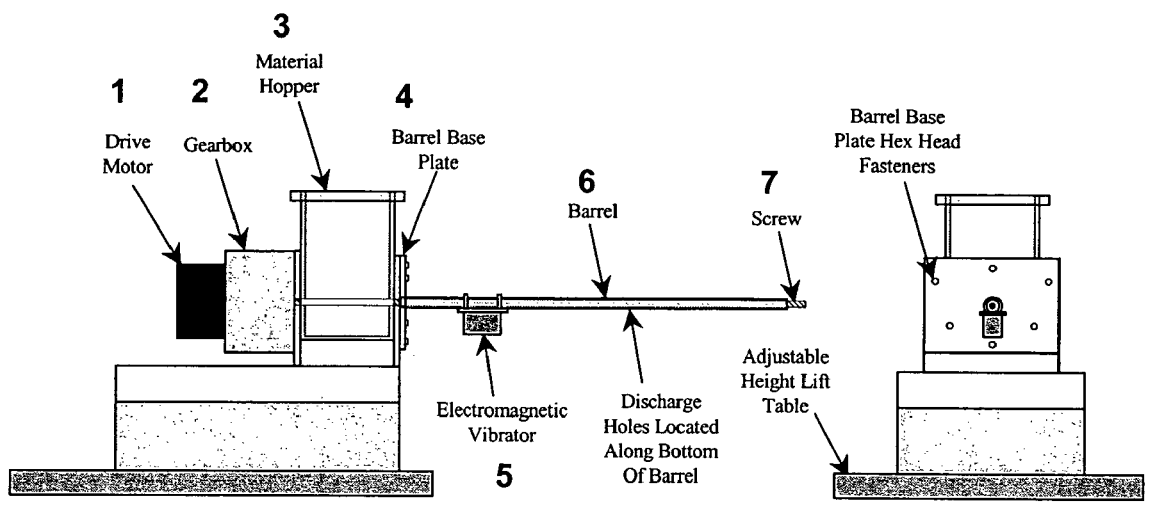
FIGURE 8A                                   FIGURE 8B
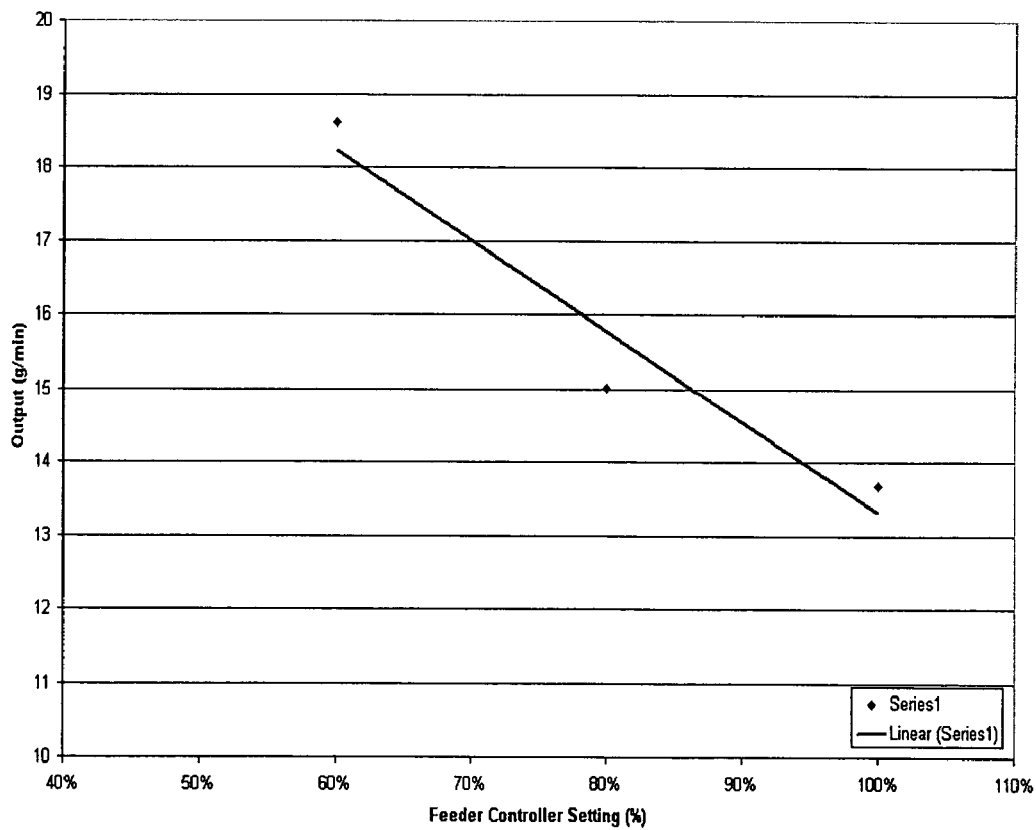
FIGURE 9

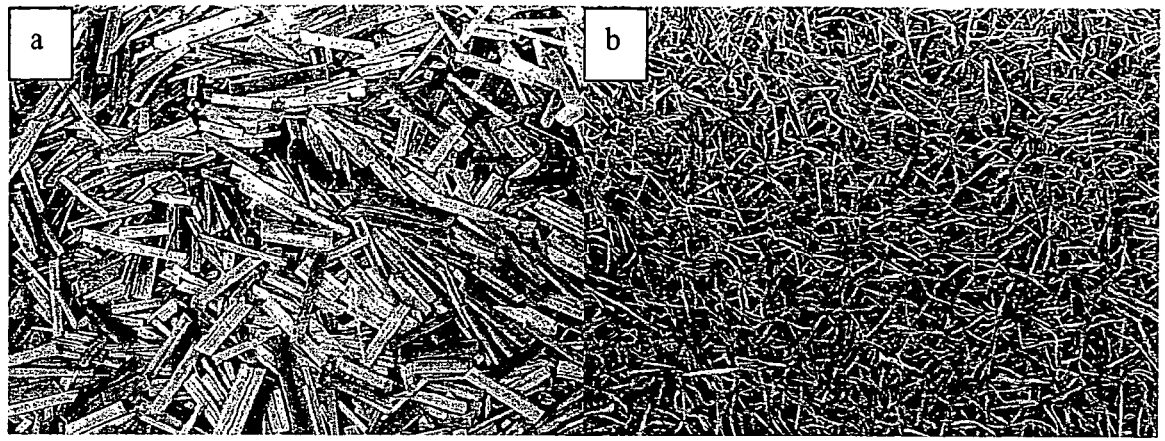
FIGURE 10A
FIGURE 10B
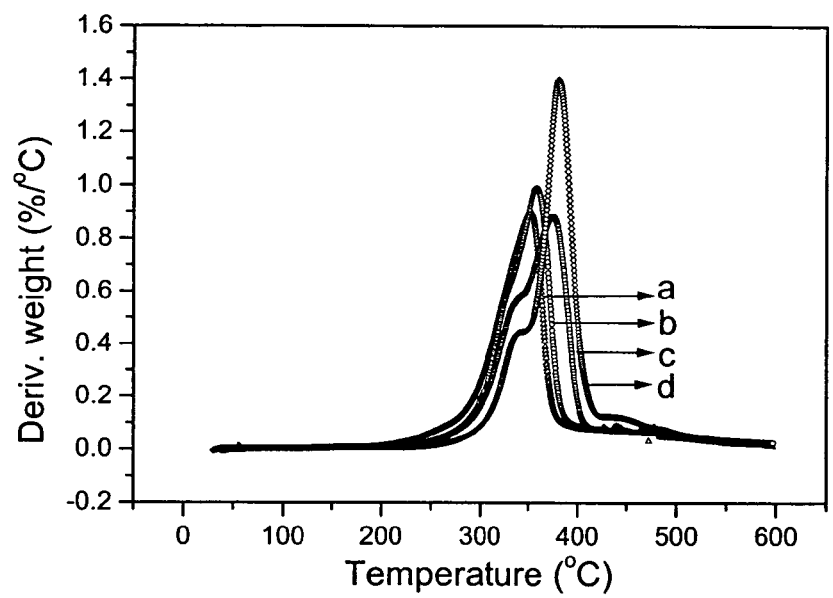
FIGURE 11

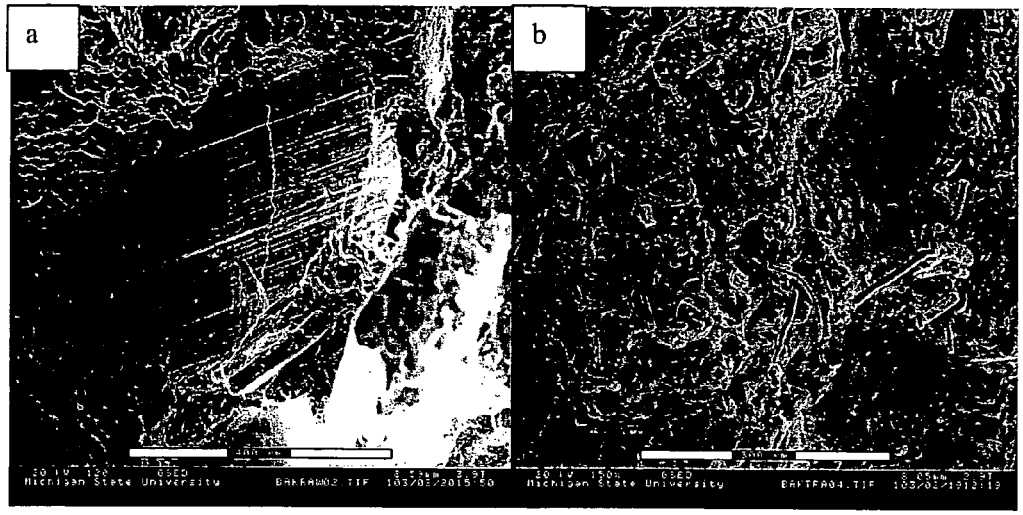
FIGURE 14A  FIGURE 14B
Screw configuration I with two kneading zones
Screw configuration II with three kneading zones FIGURE 16A
FIGURE 16B
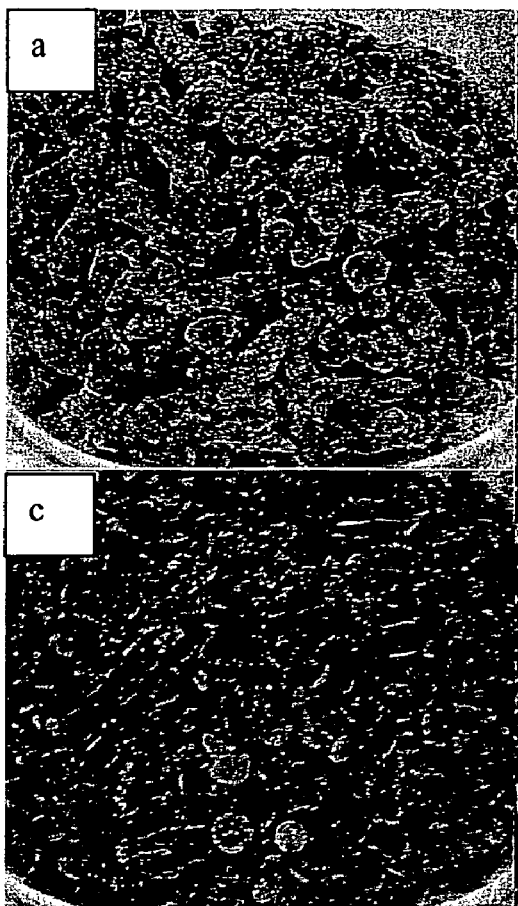
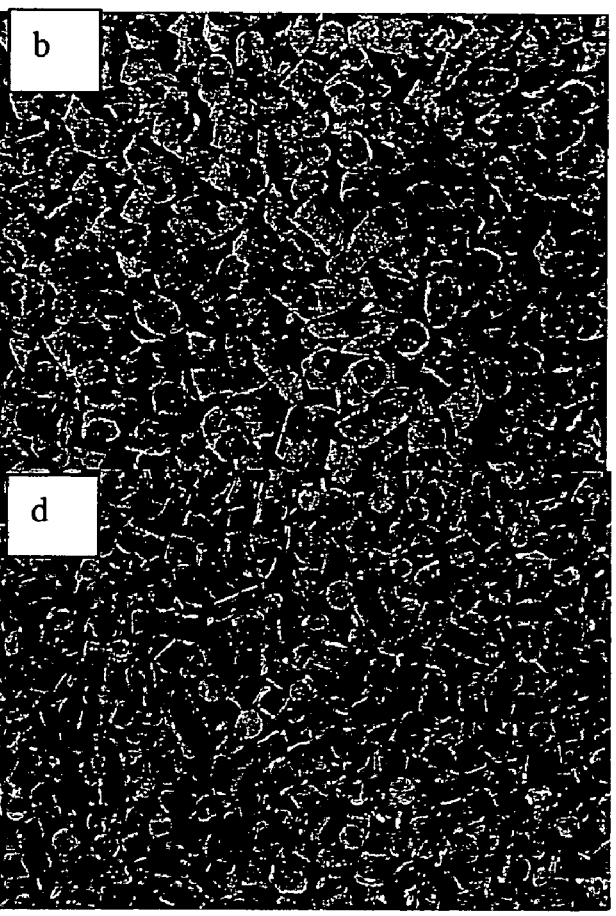
FIGURE 16C
FIGURE 16D a.) Veil Material Coming Off Of SMC Line b.) Roll Of Veil Material Ready For Processing FIGURE 25A
FIGURE 25B
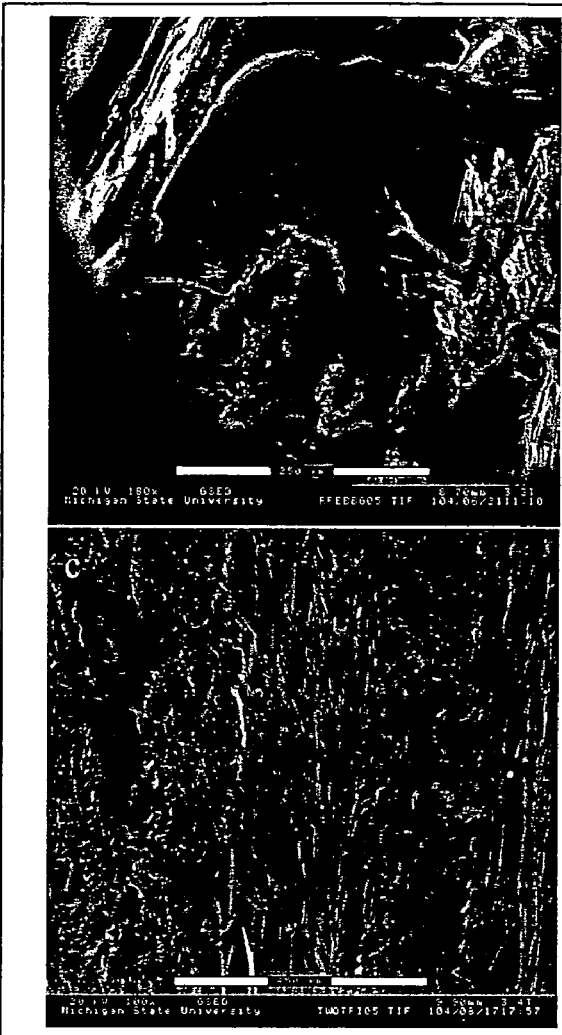
FIGURE 25C
FIGURE 25D

CELLULOSIC BIOMASS SOY FLOUR BASED BIOCOMPOSITES AND PROCESS FOR MANUFACTURING THEREOF

CROSS-REFERENCE TO RELATED APPLICATIONS

This application claims priority to provisional application Ser. No. 60/605,112, filed Aug. 27, 2004.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention provides: (i) processing of natural fibers (such as grass, rice straw, wheat straw, industrial hemp, kenaf, pineapple leaf fibers) for reinforced biocomposites with a matrix of soy based bioplastic, (ii) the synthesis of effective coupling agents for grass fiber reinforced soy based biocomposites and; (iii) modification of soy flour with functional monomers during processing of soy flour by industrial reactive extrusion and injection molding, (iv) novel sheet molding compounding followed by compression molding processing for the soy flour polymer and cellulose biomass based biocomposites.

(2) Description of Related Art

The following is related art: U.S. Pat. No. 5,321,064 to Vaidy et al; U.S. Pat. No. 5,446,078 to Vaidy et al; U.S. Pat. No. 6,045,868 to Rayas, et al; U.S. Pat. No. 5,472,511 to Rayas et al; U.S. Pat. No. 5,605,577 to Rayas et al; U.S. Pat. No. 5,922,379 to Wang; U.S. Pat. No. 5,320,699 to Lim et al; U.S. Pat. No. 5,665,152 to Bassi et al; U.S. Pat. No. 3,615,979 to Davis et al; U.S. Pat. No. 3,713,927 to Peterson, et al; U.S. Pat. No. 3,835,212 to Piacente; DE2357000 to Peterson et al; JP49076988 to Kishino; JP49107086 to Horiuchi et al; JP50005463 to Takaishi et al; JP50008882 to Sekiguchi et al; JP50014792 to Takayama et al; JP 50036588 to Sato et al; U.S. Pat. No. 3,931,095 to Kondo et al; U.S. 2003088007 to Wool et al.

Other related references are: Stokke, Kuo, Curry, Gieselman, 6$^{th}$ International Conference on Wood fiber-Plastic Composites, Madison, 43-53 (2001); Hassan Kunbargi and Baerbel Schubert, Manufacture of pressed composite building materials, especially insulator boards and lightweight bricks and plates, from hydratable binders and lightweight aggregates and reinforcing materials, PCT Int. Appl. 18 pp. (1994); Castano, Vazquez-Polo, Amador, Garcia-Zetina, Martinez, Marquez-Amador, Altmamirano-Meza, *Journal of Reinforced Plastics and Composites* 14 (8), 866-888 (1995); Wu, Q., et al., *Polymer,* 44, 3901-3908 (2003); Ly, Y. T.-P., et al., Soy protein as biopolymer, In Biopolymers from Renewable Resources, editor(s): Kaplan, David L. 144-176 (1998); Chen, Y., et al., *Polymeric Materials Science and Engineering* 88, 455-456 (2003); Kumar, R., et al., *Polymeric Materials Science and Engineering* 89, 233-234 (2003); Otaigbe, J. U., et al., *Journal of Elastomers and Plastics* 31, 56-71 (1999); Mohanty, A. K., et al., *Macromol. Mater. Eng.* 276/277 (2000); Mohanty, A. K., et al., *J. Polymer Env.* 10 (1/2) 19 (2002); B. van Voorn, et al., Composites: Part A: Natural Fiber Reinforced Sheet Moulding Compound 32 1271-1279 (2001); Goswami, D. N., et al., Popular Plastics & Packaging, 48 (3), 68-71 (2003) and Mishra et al., Journal of Reinforced Plastics and Composites, Vol. 20, No. 4, 321-334 (2001).

Biopolymers derived from various natural botanical resources such as protein and starch have been regarded as alternative materials to petroleum plastics because they are abundant, renewable and inexpensive. The widespread domestic cultivation of soybeans has led a great deal of research into the development of biopolymers derived from their byproducts, such as soy protein. Soy proteins are complex macromolecules containing 20 amino acids and/or polypeptides. Through extrusion cooking, soy protein polymers can be converted into biodegradable plastics. However, the main disadvantage of soy protein plastic comes from its low strength and high moisture absorption. The simplest and most effective way to improve these properties is to combine soy protein with a biodegradable polymer to form soy based bioplastic. The other method is to use functional monomers or oligomers to modify soy protein during processing of soy protein with an extruder. Some patented inventions use casting methods or pretreatment methods with soy protein to form articles for applications.

Fiber reinforced composites can increase the scope of these materials and will increase applications in various arenas such as the automotive and packaging industries. Natural fibers such as kenaf, flax, jute, hemp, and sisal reinforced composites have been attractive in the past few years because natural fibers have the advantages of low cost, low density, acceptable specific strength properties, ease of separation, carbon dioxide sequestration and biodegradability. Recently, agricultural plant materials such as corn stalk, rice stalk, wheat straw and grass have been investigated as a potential resource for natural fibers since they are inexpensive, eco-friendly, sustainable, recyclable, biodegradable, and are emerging as new and attractive materials with commercial viability and environmental acceptability. Generally, such agro based materials are only used as feed for livestock and not as load bearing materials. Therefore, grass reinforced composites have an excellent potential to be used as fibers. In addition, the USA has plenty of grass resources. Currently, elephant grass-based biocomposites are being investigated in Europe for automotive applications.

Now, the use of renewable materials from sustainable sources is increasing in a variety of applications. Interest in the use of natural fibers has grown during the last decade due to their various advantages. Biocomposites in general are materials made by nature or produced synthetically that include some type of natural material in their structure. In our research, biocomposites are also known as natural fiber composites. Biocomposites are formed through the combination of natural cellulose fibers with other resources such as biopolymers, resins, or binders based on renewable raw materials. The objective is to combine two or more materials in such a way that a synergism between the components results in a new material that is much better than the individual components. Biocomposites are the smart materials of the future. It is only through these materials that the balance of ecology and economy can be maintained. The properties of plant fibers can be modified through physical and chemical technologies to improve performance of the final bio-composite. Some of the plant fibers with suitable properties for making biocomposites are: hemp, kenaf, coir, henequen, jute, flax, sisal, banana, kapok, etc. Biocomposites can be used for a range of applications, for example: building materials, structural and automotive parts, absorbents, adhesives, bonding agents and degradable polymers.

Biocomposites have been traditionally manufactured with techniques like extrusion, injection molding, compression molding, resin transfer molding, and pultrusion. But they have never been produced using a Sheet Molding Compounding (SMC) line. SMC is a very useful processing technique usually used for fabricating glass-polyester resin composites. Today more and more parts and products from cars to skis, hockey sticks to microwaves are being molded from SMC. This is not too surprising since thermoset composite plastics have been used for more than sixty years around the world. A recent U.S. report states that the demand for thermoset composites in the automotive industry will rise by 68 percent to 467 million pounds by the middle of this decade. The reason is simple; SMC combines high strength and light weight. Other advantages of thermoset composites are durability and resistance to corrosion in a wide range of temperature environments. The application of a priming and topcoat allows SMC components to meet automotive "class A" surface finish requirements.

Ever since the 1970's there have been numerous patents on SMCs. U.S. Pat. No. 3,615,979 granted in 1971 was a patent for glass fiber-reinforced sheet molding compound, by Owens-Corning Fiberglas Corp. U.S. Pat. No. 3,713,927 granted in 1973, thermosetting sheet molding compounds. U.S. Pat. No. 3,835,212 granted in 1974 was a patent for resinous sheet like products. DE 2357000 granted in 1974 was a patent for sheet molding compounds. JP 49076988 granted in 1974 was a patent for unsaturated polyester compositions for moldings. JP 49107086 granted in 1974 was a patent for unsaturated polyester compositions. JP 49107086 granted in 1974 was a patent for unsaturated polyester compositions. JP 50005463 granted in 1975 was a patent for molding of unsaturated polyesters. JP 50008882 granted in 1975 was a patent for molding resin compositions. JP 50014792 granted in 1975 was a patent for sheet molding compositions. JP 50036588 granted in 1975 was a patent for sheet molding compositions. U.S. Pat. No. 3,931,095 granted in 1976 was a patent for fire retardant thermosetting resin composition.

There have been many improvements in the SMC process since the 1970s, and hence many more patents. But none of these cater to SMCs with natural fibers and resins. However, there is one patent and two papers which talk about SMC processing for biocomposites. These include, US 2003088007 granted in 2003 to Wool et al, which is a patent for sheet molding compound resins from plant oils. Van Voorn et al discussed a non automated SMC process for making biocomposites in, "Natural fibre reinforced sheet molding compound", in 2001. Goswami et al, made jute (cloth) reinforced sheets with the help of polyester resin in "Jute reinforced sheets based on shellac filled SMC", in 2003.

Traditionally, glass or carbon fibers are used as reinforcement materials to strengthen polymeric materials, however, only a few attempts have been made to reinforce thermoplastics with natural grasses because it is primarily used as a feed for livestock and not as an engineering material. Few studies have been done in the grass reinforced composites area. The only existing reference using grass reinforced thermoplastic composites was done by Stokke et al [1] (Stokke, Kuo, Curry, Gieselman, 6th International Conference on Woodfiber-Plastic Composites, Madison, 2001. P. 43-53). Materials used were switch grass and high density polyethylene. Extrusion was used to combine grass and polyethylene. Hassan Kunbargi and Baerbel Schubert (PCT Int. Appl. (1994), 18 pp.) used hydratable binders and lightweight aggregates and reinforcing materials (grass and other vegetable materials, glass fiber, manmade fiber) to manufacture composites as building materials, especially insulator boards and lightweight bricks and plates by press methods. The products comprise lightweight cellulose boards, concrete-wood bricks, and cement-bonded particleboards. Castano et al (Castano, Vazquez-Polo, Amador, Garcia-Zetina, Martinez, Marquez-Amador, Altmamirano-Meza) (Journal of Reinforced Plastics and Composites (1995), 14 (8), 866-88.) used a natural fiber grass (Palma samandoca) as the reinforcement material with a thermo-set polyester resin to form composites with good mechanical strength and rigidity as compared to the pure resin. Actually, Castano et al. used grass as a reinforcement only for thermoset materials with compression molding methods and hence, there were no attempts to use grass as a reinforcing material to strengthen thermoplastics to form composites.

Soy protein is an important alternative to petroleum based plastic materials because it is abundant, renewable and inexpensive. Soy protein has a great potential to be used as a plastic in many applications. Many scholars are working in this area to attempt to turn soy protein into a useful plastic material. When extruder cooking is used with a plasticizer or crosslinking agent, soy protein can become a useful plastic. The chemical modification of soy protein with a lower molecular weight polymer containing a functional group can react with some functional groups such as carboxyl or amino groups in the protein, which provides one method to modify protein. Wu et al., (Studies on the toughness and water resistance of zein-based polymers by modification, Polymer, 44, 3901-3908 (2003)) modified protein by using low molecular weight polycaprolactone (PCL)/hexamethylene diisocyanate (HDI) prepolymer. Through a chemical reaction between the amino acid in the protein, and HDI modified PCL, a urea-urethane linkage in the protein and PCL prepolymer complex was formed, leading to an increase in toughness and water resistance of the modified soy protein. Jane et al (Soy protein as biopolymer, in Biopolymers from Renewable Resources Editor(s): Kaplan, David L. (1998), 144-176) grafted vinyl monomers like methyl methacrylate, ethyl acrylate, butyl acrylate and hexyl acrylate to soy protein using a free radical mechanism to form vinyl polymer modified soy protein, which did not improve mechanical properties. Chen et al., (Structure and properties of sheets based on various soy products modified with polyurethane prepolymer, Polymeric Materials Science and Engineering, 88, 455-456 (2003)) used a polyurethane prepolymer (PUP) modified soy protein plastic and measured the enhancement in toughness and water resistance.

Enzyme modification is another method to enhance certain properties of soy protein. Kumar et al., (Soy protein based films: Effect of enzymatic hydrolysis on mechanical properties and fungus growth. Polymeric Materials Science and Engineering, 89, 233-234 (2003)) studied the influence of enzyme modification on mechanical properties and found that tensile strength decreased significantly but elongation increased. Starch can be used as a filler material to modify soy protein plastic as it forms hydrogen bonding or polar interaction with soy protein (Processability and properties of biodegradable plastics made from agricultural biopolymers, Journal of Elastomers and Plastics, 31, 56-71 (1999)). U.S. Pat. No. 5,922,379 provides a method of making biodegradable protein starch based thermoplastic for applications in foam materials. They are using protein, starch, cellulose fiber, plasticizer, water, blowing agents, nucleating agents, metallic salt hydrates and crosslinking agents to form the foam materials. U.S. Pat. No. 5,665,152 describes a method of using water, reducing agents, plasticizers, starches and proteins at temperatures up to 80° C. to form a biodegradable solid article, especially in film. U.S. Pat. No. 5,320,669 describes the method of using protein, starch, organic solvents such as ethanol and ether, acid anhydride as a crosslinking agent, bleaching agents, plasticizers and water to form biodegradable plastic. However, the organic solvent can not be polymerized during processing. By using water, the useful properties of materials can be changed with time. Therefore, the improvement in soy plastic is limited.

Casting soy protein solution is another method of forming a soy protein film. U.S. Pat. Nos. 5,605,577 and 5,472,511 provide a method of using ethanol, water, and a reducing agent to remove proteins from grain flours and using the remaining solution to form edible and biodegradable film by casting methods. U.S. Pat. No. 6,045,868 describes a method for casting a biodegradable film for packaging by using grain flour protein through the use of water, reducing agents, crosslinking agents and certain pH solution environments.

Blending with other biodegradable polymers is the other method used to form soy protein. U.S. Pat. Nos. 5,446,078 and 5,321,064 use a reactive blending method to combine natural polymers such as protein and starch with a synthetic polymer through chemical or physical bonding to form an interpolymer. It should be pointed out that soy protein is easily denatured by heat during processing. Therefore, when forming soy based bioplastic, the processing window should be matched with that of soy protein so that the properties of soy protein can be kept consistent. On the other hand, soy protein should first be changed to soy protein plastic when used as plastic and not as a filler.

The traditional SMC (Sheet Molding Compound) process is a combination of chopped glass strands and filled polyester resin (thermoset) in the form of a sheet. SMC is a fully formulated system (fiber, resin, and additives), which can be molded without additional preparation. Sheet molding compound can be made with random chopped fiber reinforcement, with continuous fibers, or with a mixture of the two. The variety of fiber architectures available for sheet molding compound means a variety of properties can be achieved in compression molded parts. Traditional SMC prepreg is made from chopped glass strands, sandwiched between two layers of film, onto which the resin paste has already been applied. The prepreg passes through a compaction system that ensures complete strand impregnation before being wound onto rolls. These are stored for a few days before molding to allow the prepreg to thicken to a moldable viscosity. SMC is aged to a state near gelation. The manufacturer allows the SMC to reach an extent of reaction close to gelation because it stabilizes the polymer. This light crosslinking increases viscosity and improves processability of the SMC. This ready-to-mold glass fiber reinforced polyester material is primarily used in compression molding. Sheet Molding Compound (SMC) produces highly cross-linked and highly filled systems, in which the polymer component is a thermoset unsaturated polyester. The molded product combines high modulus with high strength. This is more expensive than metal, but has a lower tooling cost.

So far, no industrial continuous process has been reported in literature for fabrication of biocomposites via SMC using chopped natural fiber and powder thermoplastic. Only one research group (From Agricultural Research Center, (ATO), Wageingen University Research Center, The Netherlands) has reported the use of SMC for making biocomposites. The natural fibers in their process are not continuously fed to the SMC line. They do it with a batch process. Thus, their process is not fully automated, and hence can't be used in an industrial setting.

OBJECTS

The main objective of this invention is to manufacture soy flour based, biodegradable, and common thermoplastics with biomass grass as a reinforcement to get comparable properties to conventional reinforced materials by using plastic processing techniques such as extrusion, injection molding, sheet molding compounding and compression molding. The effects of surface treatment on biomass grass and the effects of coupling agents on physical properties of grass-based biocomposites are included in this objective. Additionally, the modification of soy protein plastic through reactive extrusion technology and the synthesis of coupling agents for soy-based biocomposites will be included. The objective will also be to manufacture biocomposite sheet material using a slightly modified sheet molding compounding line and show that product can be successfully made in a continuous process suitable for industrial applications. These and other objects will become increasingly apparent by reference to the following description and the drawings.

SUMMARY OF THE INVENTION

The present invention relates to a polymer composition which comprises: thermoplastically processed plasticized soy flour comprising protein and carbohydrate and a thermoplastic polymer.

Further, the present invention relates to a polymer composition which comprises a soy flour comprising protein and carbohydrate and an in situ polymerized polyvinyl polymer which links with the proteins and the carbohydrates in the flour.

Still further, the present invention relates to a soy based polymer composite, which comprises: soy flour polymerized with organic peroxide initiated styrene, glycidyl methacrylate or mixtures thereof.

Further still, the present invention relates to a process for the preparation of a polymer composition which comprises: (a) thermoplastically processing a mixture of a plasticized soy flour comprising protein and carbohydrate and a thermoplastic polymer to provide an extrudate; and (b) cutting the extrudate into pellets.

Further, the present invention relates to a process for the preparation of a polymer composition, which comprises: providing a mixture of a vinyl monomer and a soy flour with an initiator for the polymerization of vinyl monomer to vinyl polymer; and extruding the mixture at a temperature so that the vinyl polymer is formed between the soy flour and the polymer.

DESCRIPTION OF FIGURES

FIGS. 6A and 6B schematically show biofiber feeding system in front and end views, respectively.

FIGS. 7A and 7B are drawings of a spray nozzle system.

FIGS. 8A and 8B are schematic front and end views, respectively, of a powder curtain feeder.

FIG. 9 is a graph showing a powder curtain feeder output based on controller setting.

FIGS. 10A and 10B are digital pictures of (A) raw grass fiber, and (B) grass fiber treated with 10% alkali solution for 4 hours.

FIG. 11 is a graph showing DTA curves of (a) raw grass fiber, (b) grass fiber treated with 5% alkali solution for 2 hours, (c) grass fiber treated with 10% alkali solution for 2 hours, and (d) grass fiber treated with 10% alkali solution for 16 hours.

FIGS. 14A and 14B are Examples of morphology of tensile fracture surface of (14A) raw and (14B) alkali treated grass reinforced soy based bio-composites.

FIGS. 15A and 15B are schematic of screw configurations for the extruder. FIG. 15A is a drawing of a screw configuration I with two kneading zones (darkened). FIG. 15B is a drawing showing a screw configuration II with three kneading zones (darkened).

FIGS. 16A to 16D are digital pictures of soy flour plastic of (16A) processed with screw configuration I and (16B) processed with screw configuration II and soy based bioplastic of (16C) processed with screw configuration I and (16D) processed with screw configuration II.

FIGS. 25A to 25D are ESEM images of HDPE/grass biocomposites for (25A), 150 psi molded sample with picture frame, (25B), 3000 psi molded sample with picture frame (25C), 1500 psi/190° C. molded sample with closed mold, and (25D), 2000 psi/190° molded sample with closed mold.

DESCRIPTION OF PREFERRED EMBODIMENTS

Figure 1:
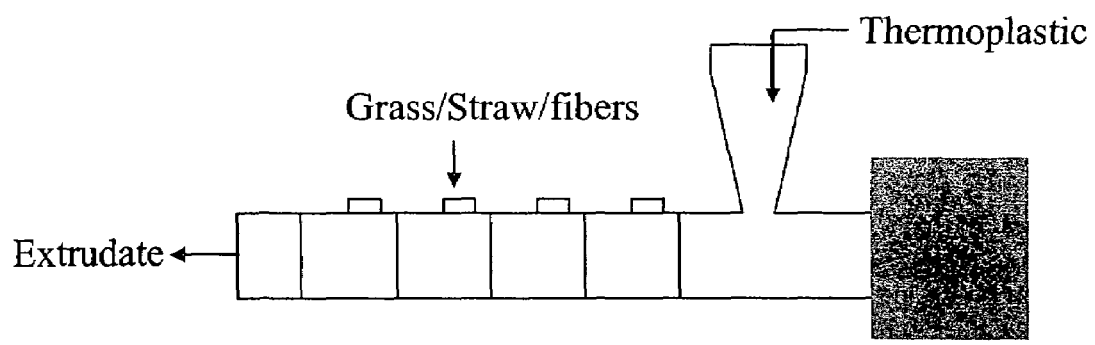
FIG. 1 is a schematic drawing of extrusion process.

The present invention particularly provides the methods for preparing grass fiber reinforced composites with different matrices such as a biodegradable soy based bioplastic, cellulose acetate butyrate and high density polyethylene. The following description details the preparation and processing of grass based biocomposites, the synthesis of an effective coupling agent for the fiber reinforced soy based biocomposite, and the modification of soy flour with a functional monomer during processing of soy flour by using reactive extrusion technology. The use of functional monomer modification of soy flour during processing increases the mechanical strength of the soy flour based plastic. The use of a coupling agent for biomass grass based biocomposites can also increase the performance of the composite. Through reactive extrusion methods, functional monomer modified biopolymer is used as a coupling agent for soy based composites. Soy flour plastics can be processed with fiber and coupling agents at their processing temperatures by using a standard industrial scale or lab scale extruder, and the desired biocomposite part can be produced by using a standard injection molder. Soy flour based plastic is made in a standard industrial scale or lab scale extruder and then is compounded with other materials in an extruder. Finally, grass reinforced soy based biocomposites can be compounded and pelletized by using extrusion and the desired product can made by using injection molding. Additionally, after the alkali solution treatment, the grass reinforcement in the biocomposite functions similar to a glass fiber, namely the grass fiber is separated well and its dispersion in the matrix is homogenous because of shear forces and the interaction between fiber and matrix during processing.

The purpose of this invention is to produce low cost green materials (biocomposites) using conventional thermoplastic powder and bio-degradable thermoplastic soy based polymers for use in various housing, automotive, furniture and aircraft applications. Methods for preparing and processing biocomposites using extrusion, injection molding and compression molding are detailed. Because biocomposites have traditionally been made using these processes and have limited control over the degree of fiber degradation and fiber alignment, a novel high volume high speed processing technique named "biocomposite stampable sheet molding compound panel" (BCSMCP) manufacturing process was developed for use with powder thermoplastic resins so as to mimic the continuous sheet molding compound (SMC) process currently used in making glass fiber-polyester resin composites. Various process parameters were adjusted and optimized for natural fibers. Batch to batch repeatability was established after running numerous experiments with grass fibers and soy based polymer. The prepreg made on the SMC line was then compression molded and the samples were tested for various mechanical and thermal properties, in accordance with ASTM procedures. The natural fibers including flax, big blue stem grass, hemp, jute, henequen, kenaf, were used as reinforcement in a thermoplastic soy based polymer. Biofiber reinforced thermoplastic soy based polymer biocomposites processed by SMC line show very promising results.

Agricultural fibers are eco-friendly; perennial grasses provide additional below ground carbon sequestration because of the deep penetration of grass roots, environment friendly, low cost, low density, good specific strength; and biodegradability In this case, grass is used as a reinforcement to prepare biocomposites with a good ratio of price to performance. The current invention focuses in part on large-scale extrusion compounding of soy based biodegradable plastic with processing temperatures below 200° C. using grass as a reinforcement material to form grass based biocomposites. For grass reinforced soy based biocomposites, multiple step processing is preferably applied. First, soy flour is processed with plasticizer such as glycerol (J.T. Baker, Phillipsburg, N.J.) to obtain soy flour based polymer using extruder barrel temperatures of 95° C., 105° C., 115° C., 125° C., 130° C. and 130° C. from Zone 1 to Zone 6 and a screw speed of 100 RPM. Biodegradable polyester is then blended with soy protein plastic to produce a soy based polymer by using an extruder under a processing temperature of 130° C. and a screw speed of 100 RPM. Finally, grass reinforced soy based biocomposites are fabricated through compounding the soy flour based polymer and grass by using the same extruder and processing conditions and hence pellets are obtained. FIG. 1 is a schematic of grass reinforced thermoplastic extrusion processing. The final specimen for material property testing was obtained by feeding the pellet made from extrusion into an injection molder with a barrel temperature of 130° C., a mold temperature of 20° C., and a screw speed of 100 RPM. All the natural fiber reinforced thermoplastic composites followed the same processing routine; the only difference being the processing conditions which are given in the Examples.

The earlier resource used to prepare fiber reinforced thermoplastic biocomposites was carbon or glass fiber. Grass is an abundant resource and is readily available and because of the low ratio of price to performance, biofiber has a big potential to replace traditional fiber. The use of grass as a reinforcement has the advantage of energy savings and environmental acceptability.

Figure 2:
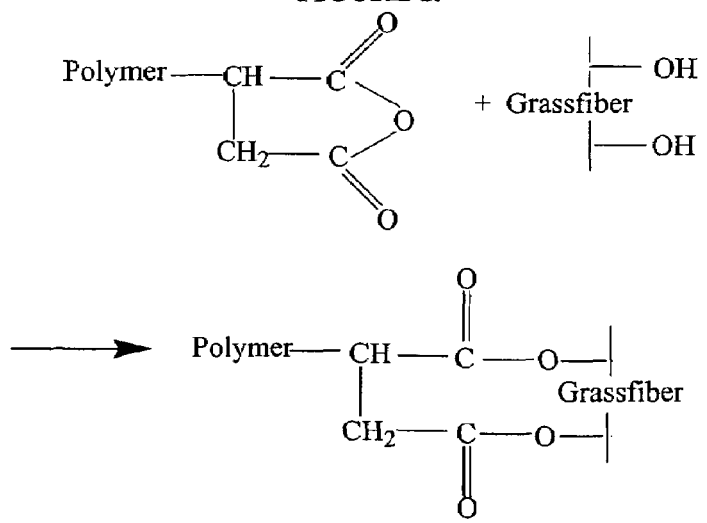
FIG. 2 shows the interaction between grass fiber and maleic anhydride grafted polymer.

The current process involves making grass fiber reinforced biocomposites by using common plastic processing machines such as extrusion and injection molding processing. In addition, the compatibilizer used for thermoplastic/grass system is a functional monomer modified polymer, such as maleic anhydride grafted polymer, which interacts with grass through a chemical reaction of a hydroxyl group on the grass surface (FIG. 2) and an anhydride group in the compatibilizer. Molecular chains of the compatibilizer also interact with the matrix through molecular entanglements. The surface treatment (such as alkali) conditions of grass have been optimized and the morphological structure and thermal properties of raw and alkali treated fibers have been studied by using environmental scanning electron microscopy and thermogravimetric analysis, respectively. Grass fiber showed a reduction in fiber size and an increase in entanglement after the alkali treatment. It also showed improved thermal stability after alkali treatment due to the removal of hemicellulose and lignin. Also, the cementing materials between interfibrills in grass were reduced because of the removal of hemicellulose and lignin which resulted in the easy separation of grass fibers, which have an important effect on the properties of grass-based composites.

Figure 3:
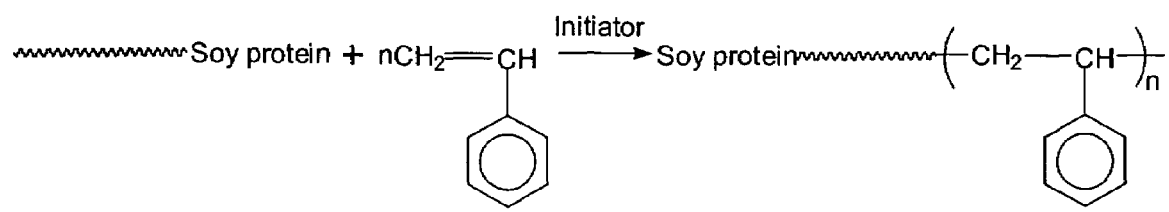
FIG. 3 is a chemical schematic of a possible reaction between soy protein and styrene.

Raw grass and surface treated grass was incorporated into the thermoplastic matrix by using an extruder under respective processing temperatures. The extrudate was pelletized in line for further processing. These grass based composite pellets were then injection molded into tensile coupons so that the mechanical properties could be evaluated. The injection molding barrel temperature used was 130° C. The mechanical properties of the composites were evaluated. The dispersion of raw and alkali treated grass fibers in the matrix was characterized, which indicated that the dispersion of grass in the matrix was average and the grass fiber was a real separated single fiber similar to a glass fiber. It is possible that a reduction of the cementing force between interfibrillar regions after alkali solution treatment may have made it easier for shear forces during processing to separate fibers for better mixing and dispersion. This better dispersion increases the interaction between fiber and matrix, which includes the hydroxyl group or carboxyl group in the matrix and the hydroxyl group in fiber. Soy protein plastic has the disadvantage of a low strength and high moisture absorption, therefore, chemical modification of soy protein plastic is necessary. We used maleic anhydride (MA), glycidyl methacrylate (GMA), Styrene, and organic peroxide with a plasticizer to modify soy protein during processing to form a new type of soy protein plastic. The mechanism in this process involves the interaction of both maleic anhydride and glycidyl methacrylate with soy flour through hydrogen bonding with carbohydrates and the chemical interaction with the amino acid in soy protein. However, maleic anhydride is difficult to self polymerize because of the big side group so a styrene co-monomer was used to copolymerize with it. Thus, the monomer will polymerize in situ with soy flour through polymerization and chemical interaction and a new soy plastic will form during processing. It was found that after modification with MA/styrene, GMA and styrene, tensile strength increased 20%, 40%, and 80%, respectively, compared with unmodified soy flour plastic. Only styrene modified soy flour plastic increased in modulus. One possible cause is that the styrene monomer may have polymerized in situ in the presence of soy flour during processing. The other possible cause is that when the soy protein molecular chain is broken it forms radicals, which supply a site to copolymerize with the styrene monomer (as shown in FIG. 3). Therefore, polystyrene could have attached to the soy protein and formed styrene soy protein copolymer, which resulted in a higher strength and modulus. Adding coupling agents is also a method that can be used to improve properties of soy based biocomposites. Coupling agents generally are functional monomer modified polymers. We are using functional monomers such as glycidyl methacrylate modified with biodegradable polyesters such as polyester amide by using the reactive extrusion method. Polyester amide, a functional monomer such as glycidyl methacrylate, and an initiator were premixed and fed into an extruder at processing temperature. After reacting for a certain time (3-5 min), samples were collected and characterized by analysis methods such as FTIR, TGA and DSC. It was found that glycidyl methacrylate was grafted to the polymer. Amongst all natural fiber reinforced soy based biocomposites, pineapple leaf fiber (PALF) gives the best mechanical performance. The addition of polyester amide grafted glycidyl methacrylate when used as a coupling agent for PALF reinforced soy composites increased the mechanical properties because of the interaction between the epoxy group in the coupling agent and the hydroxyl group on the fiber surface.

Continuous Biocomposite Sheet Molding Compound Panel Process Description

The new SMC process for natural fibers can be done on conventional commercial SMC equipment with minor changes. In industrial SMC set-ups, the glass fibers rovings are fed to a chopper, and chopped fibers fall onto the carrier film. Natural fibers are not supplied as continuous rovings or yarns, and must be fed to the film in a chopped form. Therefore, chopped fibers fall from a calibrated vibratory feeder onto the carrier film, get coated with thermoplastic resin with spray nozzles or a powder curtain feeder, advance to the compression rollers, and the finished product is obtained at the end of the line. The product is then compression molded to get the desired shape.

The Continuous Biocomposite Sheet Molding Compound Panel Process can be broken down into four main components (See FIGS. 4 and 5):
1.) The biofiber feeder assembly
2.) The spray nozzle assembly or powder curtain feeder
3.) The infra-red heater bank
4.) The friction grip drive wheels/Continuous Teflon belt drive system A continuous glass reinforced Teflon belt is driven by a friction grip drive wheel assembly. The belt first passes underneath the vibratory feeder, which distributes biofiber evenly over the belt at a continuous set output rate creating a fiber mat. The vibratory feeder is starve fed fiber from a twin-screw feeder. The fibers then pass through a PE powder/H2O suspension spray or powder curtain that coats them with the matrix material. Sintering is accomplished with an 18 kW infrared heater bank, which has variable temperature control. The semi-consolidated veil material is then removed at the end of the line.

1. Biofiber Feeder Description

The biofiber feeder system consists of four main components (See FIGS. 6A and 6B):
1.) The material feed hopper
2.) The twin screw feeder
3.) The fiber distribution feed chute
4.) The vibratory feeder The feeder is described in Ser. No. 10/966,988, filed Oct. 15, 2004, which is assigned to a common assignee. This application is incorporated herein by reference in its entirety.

Biofiber is put in the hopper for feeding. The fiber is then fed onto the fiber distribution feed chute by a K-tron model # K2MVKT20 twin-screw feeder, which is calibrated to output the required fiber weight/minute. A custom designed and built fiber distribution chute spreads the fiber out uniformly from the width of the twin feeding screws to the width of the vibratory feeder. The fiber distribution chute is vibrated by an adjustable pneumatic rotary ball vibrator to keep the fibers from building up on the chute and to provide fluid like flow to provide even distribution.

Elastomer vibration isolation mounts secure the fiber distribution chute to the vibratory feeder support frame and allow the chute to vibrate independently from the rest of the system at its own frequency and intensity. A custom built Eriez Magnetics vibratory feeder then conveys the fiber to a slot opening at the end of the feeder tray providing the uniform distribution of fiber onto the SMC sheet.

2. Spray Nozzle Assembly/Powder Curtain Feeder Spray Nozzle Assembly

The spray nozzle assembly was constructed of four Paasche H#3L airbrush assemblies mounted onto an aluminum support structure with a swiveling head to allow spray angle adjustments (See FIGS. 7A and 7B). The airbrushes are fed a polyethylene powder in $H_2O$ suspension via. a Cole Parmer Masterflex L/S Digital Standard Drive with (4) model #7518-10 easy load heads through size 14 Norprene Masterflex tubing. Each airbrush has its own head and supply tubing to provide consistent volumetric flow. Compressed air is supplied to the airbrush to atomize the suspension and uniformly coat the biofibers on the Teflon belt. A stirring hot plate is used with a magnetic stir bar to keep the polyethylene suspension from separating.

Powder Curtain Feeder

The powder curtain feeder system consists of seven main components (See FIGS. 8A and 8B):
1.) The drive motor
2.) The speed reduction gear box
3.) The material hopper
4.) The barrel base plate
5.) The electromagnetic vibrator
6.) The barrel
7.) The screw An Acrison Inc. model #A-406-40-10-BDFM-C screw feeder was modified to be used as a powder curtain feeder. A custom made 44⅝" long×½" I.D. barrel was made and was modified by milling (24) 0.0625" diameter holes in the bottom of the barrel over the center 16". Polymer powder is conveyed down the barrel and falls through the holes onto the moving Teflon belt. A small electromagnetic vibrator is attached to the base of the barrel and is used to impart energy into the polymer powder particles. This causes the powder to behave like a liquid which helps prevent clogging of the holes and facilitates uniform distribution. An aluminum barrel base adaptor plate was manufactured to allow interchangeable barrels so that different hole sizes and geometries can be used.

The powder curtain feeder output was found to decrease with increasing volumetric flow setting (see FIG. 9). Output was measured by centering a 12" wide aluminum foil pan underneath the discharge holes. Powder was collected for 4 minutes and was weighed to determine the feed rate in g/min. This was repeated to verify the initial measurement. This was repeated for 100%, 80% and 60% output settings.

3. Heater Assembly

Figure 4:
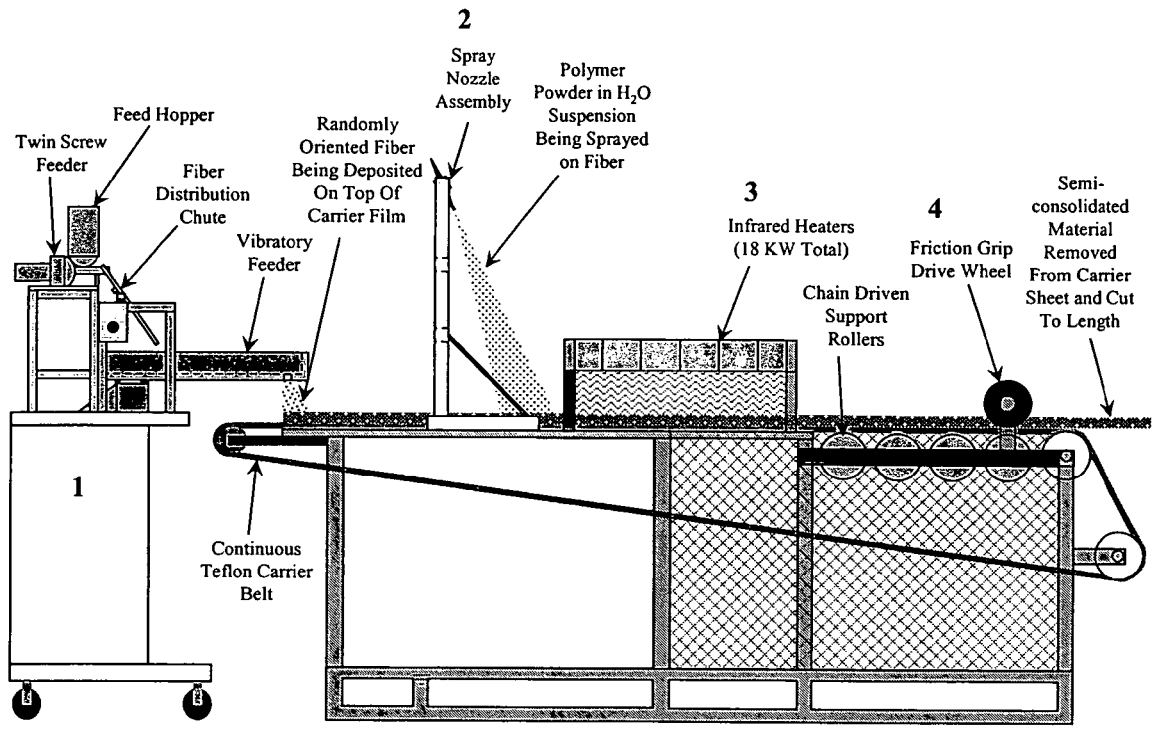
FIG. 4 is a schematic drawing of a continuous Bio-composite Sheet Molding Compound Panel (BCSMCP) manufacturing process with Spray Nozzle Assembly.
Figure 5:
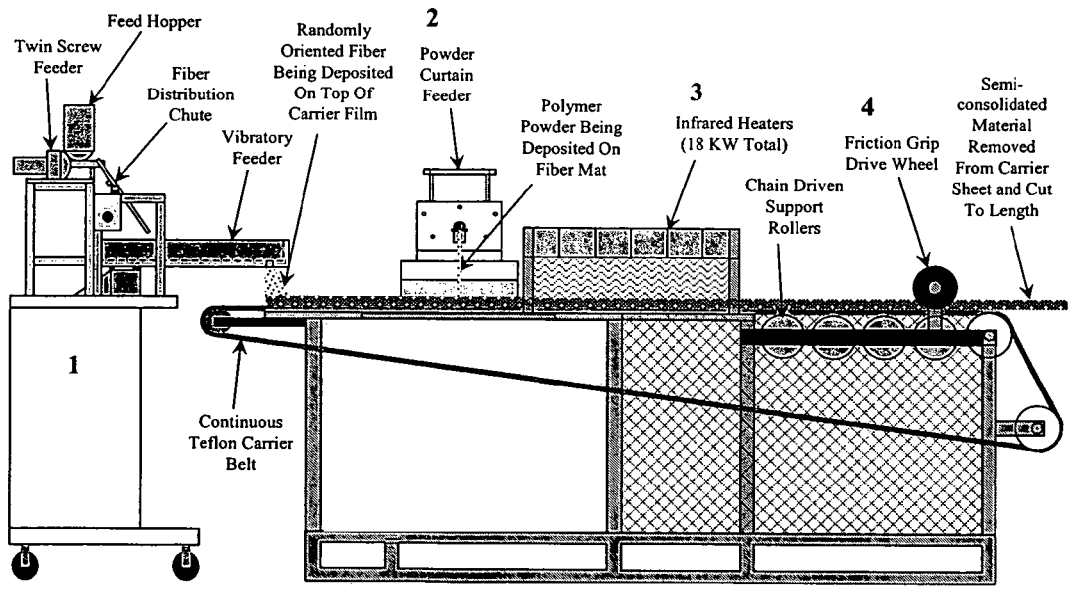
FIG. 5 is a schematic drawing of a continuous Bio-composite Sheet Molding Compound Panel (BCSMCP) manufacture process with powder curtain feeder.

The heater assembly was constructed of 9 Ogden Black Body Housings attached to an adjustable height Unistrut support frame (See FIGS. 4 and 5). Each bank houses two Ogden A-1-1000 220/230 V 1 kW Ceramic Black Body Heaters for a total of 18 kW. These heaters have a maximum operating temperature of 1470 deg F. with a peak wavelength of 2.9 um, but maximum operating temperature on the line is limited to approximately 700 deg F. because of material limitations. Temperature is controlled with an Ogden ETR-3200 1/32 DIN Microprocessor based Smarter Logic® Temperature Controller. This controller is mounted in a TC-4466 16" H×14" W×6" D NEMA 4/12 steel enclosure. The heaters are supplied with 220/230 V three phase power.

4. Friction Grip Drive Wheels and Continuous Teflon Belt

A 14 mil thick 24" wide glass reinforced Teflon belt is use to convey material down the SMC line. FIGS. 4 and 5 show the two 9" dia×3" wide pneumatic wheels used to apply force to the edges of the Teflon belt. This in effect "pinches" the Teflon belt between the drive wheel and the existing SMC line compaction rollers, which provides enough friction to pull the belt through. The SMC line compaction rollers are chain driven by an AC motor and speed can be changed via. an adjustable gear reduction drive. Speed can be adjusted from approximately 0.11 in-13.42 in/sec.

Examples show detailed processing conditions and methods for manufacturing biocomposite sheet material using a SMC line. When compared to composites fabricated with extrusion and injection molding techniques, it was found that the biocomposites fabricated with the SMC line and subsequently compression molded achieved the same stiffness when optimum processing conditions such as temperature and pressure were used along with a closed mold. The stiffness was found to be dependent on the consolidation state of the composite.

Thus the current invention provides methods to fabricate grass based thermoplastic biocomposites by using grass as a reinforcement with processes such as extrusion, injection molding, sheeting molding compounding and compression molding. This invention also details surface treatment methods for grass fiber and methods to modify soy protein plastic and biodegradable polyester through reactive extrusion technology by using functional monomers or oligomers such as glycidyl methacrylate during processing. Novel continuous sheet molding processing and closed compression molding methods and the relation to mold type, temperature and pressure for biocomposites are also provided.

The following examples illustrate certain preferred formulation and manufacturing techniques for the production of grass based biocomposites.

EXAMPLE 1

Soy Based Bioplastic (Soy Protein Plastic and poly(tetramethylene adipate-co-terephthalate) Reinforced with Varying Content of Indian Grass Fiber Soy flour was obtained from Archer Daniels Midland (ADM), Decatur, Ill. Glycerol was supplied by J.T. Baker Phillipsburg, N.J. Eastar Bio co-polyester (poly(tetramethylene adipate-co-terephthalate) (PTAT) was supplied by Eastman Chemical Co., Kingsport, Tenn. Indian grass was used "as received" from Smith, Adams & Associates LLC, Okemos, Mich.

Soy flour, fiber and biodegradable polymer were dried at 80° C. under vacuum for 16 hours before processing. After drying, soy flour was blended with glycerol to the ratio of 70/30 using a kitchen aid blender. The mixed material was then fed into the extruder, a ZSK-30 Werner and Pfleiderer Twin-screw Extruder (L/D=30) with a 6 zone barrel, with processing temperatures of 95° C., 105° C., 115° C., 125° C., 130° C., 130° C. and screw speed of 100 RPM. The soy flour based polymer was re-extruded with PTAT with a processing temperature of 130° C. and screw speed of 100 RPM. The pelletized soy flour based bioplastic was then extruded with grass fiber under the above conditions. The soy flour based bioplastic was fed at a rate of 30 g/min. Grass fiber was fed at a rate of 5.3 g/min, 13 g/min and 20 g/min for 15-wt %, 30-wt % and 40-wt % fiber content reinforced biocomposites, respectively. A Cincinnati Milacron Injection Molder with a capacity of 85 tons was used to manufacture specimens for measurement. Soy flour based bioplastic and biocomposites were injection molded with a barrel temperature of 130° C. and a mold temperature of 20° C. The tensile properties, flexural properties, and notched Izod impact strength of injection molded specimens were measured according to ASTM D 638, ASTM D 790, and ASTM D 256, respectively. The mechanical properties of the composites are shown in Table 1.

TABLE 1

Mechanical properties of grass fiber reinforced soy based poly (tetramethylene adipate-co-terephthalate) biocomposites.

| Composition Wt % Grass Fiber | Tensile strength (MPa) | Tensile modulus (GPa) | Flexural strength (MPa) | Flexural modulus (GPa) | Notched Izod Impact strength (J/m) |
|---|---|---|---|---|---|
| 0-wt % | 4.5 | 0.1 | 5.1 | 0.2 | 41.8 |
| 15-wt % | 4.4 | 0.3 | 8.4 | 0.4 | 36.9 |
| 30-wt % | 5.6 | 1.3 | 10.9 | 1.0 | 42.3 |
| 40-wt % | 6.2 | 1.8 | 11.9 | 2.1 | 38.0 |

Note:
All sample processed with screw configuration I during fabrication.

For grass fiber reinforced soy based (matrix of poly(tetramethylene adipate-co-terephthalate) and plasticized soy flour) biocomposites, there was a significant enhancement in tensile strength, tensile modulus, flexural strength and flexural modulus with increasing fiber content as compared to virgin plastic. The tensile strength, tensile modulus, flexural strength and flexural modulus of 40-wt % grass fiber reinforced composites improved 40%, 1700%, 130%, and 950%, respectively, as compared to neat soy plastic. This indicates that grass fiber can be a good reinforcement for soy based bioplastic because it improves strength and modulus of the composites.

EXAMPLE 2

Soy based bioplastic (soy protein plastic and polyester amide) reinforced with varying content of Indian grass fiber. Soy flour was obtained from Archer Daniels Midland (ADM), Decatur, Ill. Glycerol was supplied by J.T. Baker Phillipsburg, N.J. Polyester amide was supplied by Bayer Corp., Pittsburgh, Pa. Indian grass was used "as received" from Smith, Adams & Associates LLC, Okemos, Mich.

Soy flour, fiber and biodegradable polymer were dried at 80° C. under vacuum for 16 hours before processing. After drying, soy flour was blended with glycerol to the ratio of 70/30 using a kitchen aid blender. The mixed material was then fed into the extruder, a ZSK-30 Werner and Pfleiderer Twin-screw Extruder (L/D=30) with a 6 zone barrel, with processing temperatures of 95° C., 105° C., 115° C., 125° C., 130° C., and 130° C. and a screw speed of 100 RPM. Soy protein plastic was re-extruded with polyester amide with a processing temperature of 130° C. and a screw speed of 100 RPM. The pelletized soy flour based bioplastic was then extruded with grass fiber under the above conditions. The soy flour based bioplastic was fed at a rate of 30 g/min. Grass fiber was fed at a rate of 5.3 g/min, 13 g/min and 20 g/min for 15-wt %, 30-wt % and 40-wt % fiber content reinforced biocomposites, respectively. A Cincinnati Milacron Injection Molder with capacity of 85 tons was used to manufacture specimens for measurement. Soy flour based bioplastic and biocomposites were injection molded with a barrel temperature of 130° C. and a mold temperature of 20° C.

The tensile properties, flexural properties, and notched Izod impact strength of injection molded specimens were measured according to ASTM D 638, ASTM D 790, and ASTM D 256, respectively. The results are shown in Table 2.

TABLE 2

Mechanical properties of grass fiber reinforced soy based polyester amide biocomposites

| Composition Wt % Grass Fiber | Tensile strength (MPa) | Tensile modulus (GPa) | Flexural strength (MPa) | Flexural modulus (GPa) | Notched Izod Impact strength (J/m) |
|---|---|---|---|---|---|
| 0-wt % | 11.7 | 0.2 | 14.6 | 0.4 | 21.7 |
| 15-wt % | 11.5 | 1.6 | 20.2 | 1.0 | 36.9 |
| 30-wt % | 11.7 | 1.9 | 28.5 | 2.0 | 43.4 |
| 40-wt % | 11.0 | 2.8 | 28.9 | 2.8 | 48.6 |

Note:
All samples were processed with screw configuration I during fabrication.

For grass fiber reinforced soy based (matrix of polyester amide and plasticized soy flour) biocomposites, there was a significant improvement in impact strength, tensile modulus, flexural strength and flexural modulus with increasing fiber content. The impact strength and flexure modulus of 40-wt % grass fiber reinforced composites improved 130% and 600% times, respectively, as compared to neat soy plastic. This indicates that grass fiber worked as a filler and not as a fiber because of the fiber aggregation. The grass fiber needed further surface treatment to improve the properties.

EXAMPLE 3

Alkali Treatment of Indian Grass Fiber

Chopped grass with a length of 20 mm was treated in 5-wt % and 10-wt % sodium hydroxide (J.T. Baker) solutions in water. After the appropriate soak time, the fiber was rinsed with distilled water until the pH of the rinse solution stabilized at 7. After storage at room temperature for four days, the alkali treated and raw fibers were dried under vacuum at 80° C. for 16 hours. The structure, morphology and thermal properties of raw and alkali treated fibers were studied by the use of X-ray photoelectron spectroscopy spectrum (XPS, Physical Electronics 5400 ESCA), Fourier transform infrared spectrum (FTIR, Perkin Elmer system 2000 Spectrometer), environmental scanning electron microscopy (ESEM, Phillips Electroscan 2020) and thermogravimetric analysis (TGA, TA 2950), respectively.

Figures 12A, 12B:
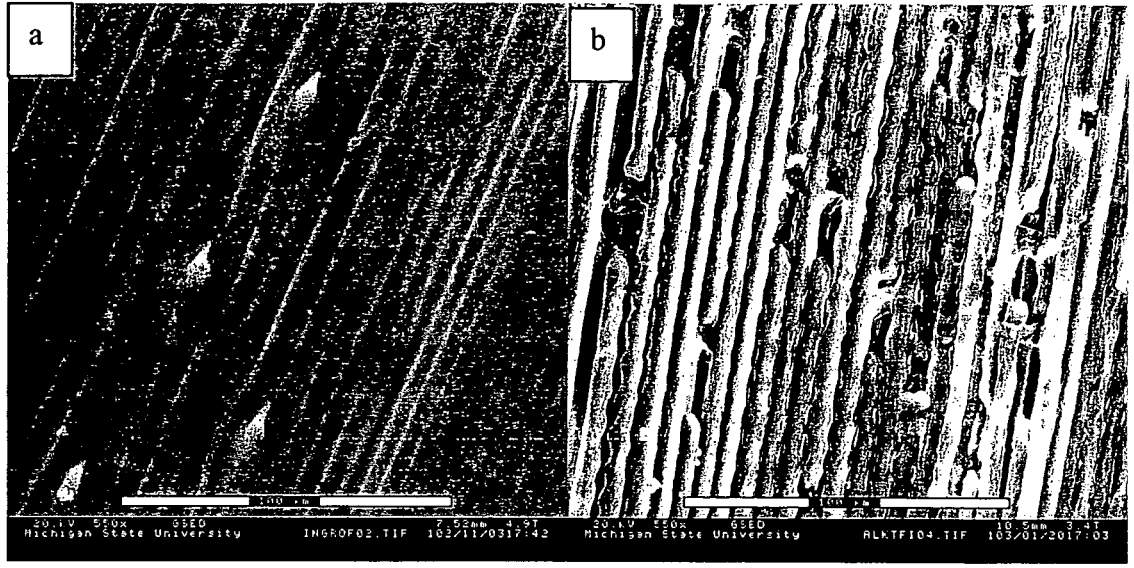
FIGS. 12A and 12B are ESEM pictures showing the morphology of raw and alkali treated fiber with magnification of 550 and scale bar of 100 μm for (12A) raw fiber and (12B) grass fiber treated with 10% alkali solution for 4 hours.
Figures 13A, 13B:
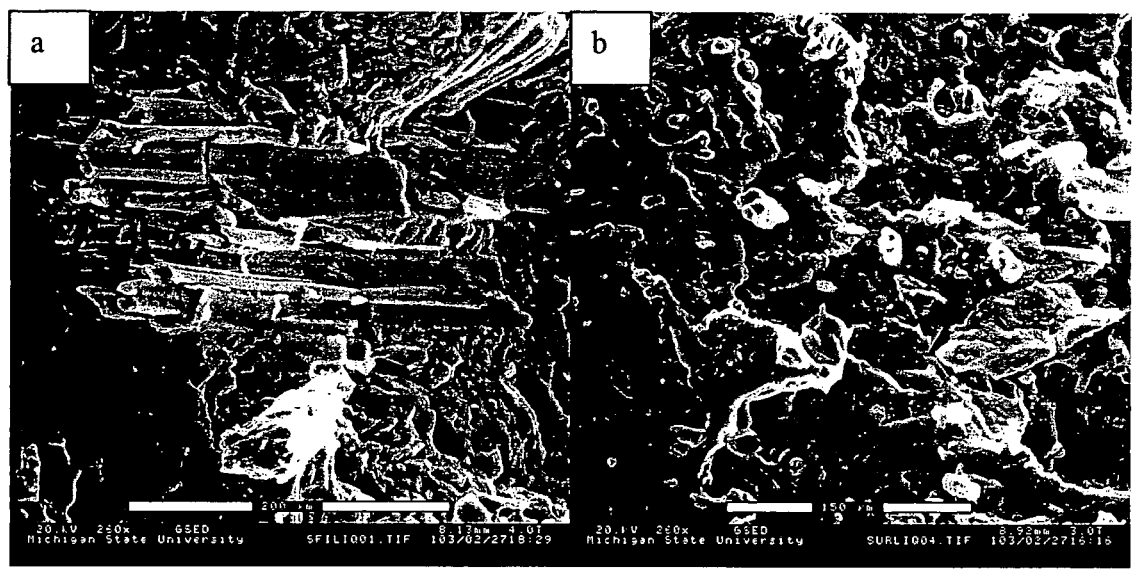
FIGS. 13A and 13B are Examples of fracture surface in liquid nitrogen of (13A) raw and (13B) alkali treated grass reinforced soy based composites.

The surface treatment (such as alkali) conditions of grass have been optimized. Digital pictures of grass fiber showed a reduction in the fiber size and an increase in entanglement after alkali treatment (FIGS. 10A and 10B). TGA showed improved thermal stability of the grass fiber after alkali treatment (FIG. 11) because of the removal of hemicellulose and lignin. ESEM showed that the cementing materials between interfibrills in grass were reduced (FIGS. 12A and 12B) because of the removal of hemicellulose and lignin and resulted in easy to separate grass fibers, which have important effect on the properties of grass-based composites. In addition, after alkali treatment, the mechanical strength and modulus of the treated grass based biocomposites increased, because of the removal of hemicellulose and lignin, and increases in the relative content of cellulose were obtained. The crystallization index of grass fibers also increased after alkali treatment, which also caused an increase in modulus and strength of the grass fibers.

EXAMPLE 4

Alkali Treated Indian Grass Fiber Reinforced Soy Based Biocomposites

Soy flour was obtained from Archer Daniels Midland (ADM), Decatur, Ill. Glycerol and sodium hydroxide were supplied by J.T. Baker Phillipsburg, N.J. Polyester amide was supplied by Bayer Corp., Pittsburgh, Pa. Soy protein based polyester amide bioplastic (soy based bioplastic) pellets were made in Composites Materials and Structures Center, Michigan State University. Indian grass was used "as received" from Smith, Adams & Associates LLC, Okemos, Mich.

The soy based bioplastic pellets were extruded with grass fiber under processing temperatures of 130° C. and a screw speed of 100 RPM. The feeding rates of soy based bioplastic and grass fiber were 30 g/min and 13 g/min, respectively. A Cincinnati Milacron Injection Molder with a capacity of 85 tons was used to manufacture specimens for measurement. Soy flour based bioplastic and biocomposites were injection molded with a barrel temperature of 130° C. and a mold temperature of 20° C.

The tensile properties, flexural properties, and notched Izod impact strength of injection molded specimens were measured according to ASTM D638, ASTM D790, and ASTM D256, respectively. ESEM was used to characterize the dispersion of the fiber in the matrix and the interfacial adhesion between fiber and matrix.

Mechanical properties of raw and alkali treated grass fiber reinforced soy based biocomposites are shown in Table 3. The impact strength of alkali treated grass fiber reinforced soy based biocomposites was enhanced about 40%, compared with raw fiber reinforced soy based biocomposites. The tensile strength and modulus of alkali treated grass fiber reinforced soy based biocomposites were improved gradually with increasing alkali solution concentration and treatment time. Flexure strength and modulus of the biocomposites had the same trends as the tensile strength and modulus. It was found that alkali solution treatment improved the dispersion of the fiber in the matrix and also reduced the fiber size. This is because of the fact that alkali solution treatment of grass biofiber removes hemi-cellulose and lignin and allows the separation of the grass fiber into finer micro fibers. The dispersion of the grass fiber in the matrix improved with increasing treatment time and concentration of the alkali solution. This led to an increase in the surface area and aspect ratio of the grass fiber, and hence, made the fibers a more effective reinforcement for the matrix. The tensile fracture surface morphology is shown in FIGS. 13A and 13B and 14A and 14B. It was found that alkali treated fiber showed a large amount of soy plastic matrix adhering to the fiber surface, indicative of good adhesion with matrix. The possible reason is that after alkali treatment, more hydroxyl groups are present on the grass fiber surface, which leads to an increased interaction between the fiber and the matrix for better interfacial adhesion.

TABLE 3

Mechanical properties of alkali solution treated Indian grass reinforced soy based biocomposites

| Condition of alkali treatment | Tensile strength (MPa) | Tensile modulus (GPa) | Flexural strength (MPa) | Flexural modulus (GPa) | Notched Izod Impact strength (J/m) |
|---|---|---|---|---|---|
| Raw | 11.7 | 1.9 | 23.1 | 2.0 | 43.4 |
| 5% 2 hours | 13.1 | 2.0 | 25.3 | 2.1 | 60.2 |
| 10% 2 hours | 14.3 | 2.1 | 26.6 | 2.2 | 55.3 |
| 10% 4 hours | 15.5 | 2.2 | 28.5 | 2.4 | 58.6 |

Note:
All sample processed with screw configuration I during fabrication.

EXAMPLE 5

Influence of Screw Configuration on Soy Protein Plastic, Soy Based Bioplastic and Indian Grass Reinforced Biocomposites Soy flour was obtained from Archer Daniels Midland (ADM), Decatur, Ill. Glycerol was supplied by J.T. Baker Phillipsburg, N.J. Polyester amide was supplied by Bayer Corp., Pittsburgh, Pa. Indian grass was used 'as received' from Smith, Adams & Associates LLC, Okemos, Mich.

Two screw configurations (as shown in FIGS. 15A and 15B) were used to compare and study the influence of screw configuration on soy protein plastic, soy flour based bioplastic and Indian grass reinforced biocomposites.

Soy flour, fiber and biodegradable polymer were dried at 80° C. under vacuum for 16 hours before processing. After drying, soy flour was blended with glycerol to the ratio of 70/30 using a kitchen aid blender. The mixed material was then fed into the extruder, a ZSK-30 Werner and Pfleiderer Twin-screw Extruder (L/D=30) with a 6 zone barrel, with processing temperatures of 95° C., 105° C., 115° C., 125° C., 130° C., 130° C. and a screw speed of 100 RPM. Pelletized soy protein plastic (as shown in FIGS. 16A to 16D) was re-extruded with polyester amide with a processing temperature of 130° C. and a screw speed of 100 RPM. The pelletized soy flour based bioplastic was then extruded with grass fiber under the above conditions. The feeding rate of soy based bioplastic and grass fiber were 30 g/min and 13 g/min, respectively. A Cincinnati Milacron Injection Molder with a capacity of 85 tons was used to manufacture specimens for measurement. Soy flour based bioplastic and biocomposites were injection molded with a barrel a temperature of 130° C. and a mold temperature of 20° C.

Extruded samples of soy flour based polymer were compression molded at a temperature of 125° C., a pressure of 42 psi for the first 10 min, and then a pressure of 167 psi for another 5 min. The sample was kept under pressure until it cooled to 50° C. Compression-molded samples were then cut into specimens for mechanical properties measurement. The tensile properties and notched Izod impact strength of compression molded specimens and injection molded soy based bioplastic and biocomposites were measured according to ASTM D638 and ASTM D256, respectively. The results are shown in Table 4.

TABLE 4

Mechanical properties of soy protein plastic, soy based bioplastic and soy based biocomposites processed with different screw configuration.

| Composition | Tensile strength (MPa) | Tensile modulus (GPa) | Tensile elongation (%) | Notched Izod Impact strength (J/m) |
|---|---|---|---|---|
| Soy flour polymer (I) | 3.0 | 0.2 | 3 | 22 |
| Soy flour polymer (II) | 3.5 | 0.1 | 5 | 23 |
| Soy based bioplastic with polyester (I) | 11.7 | 0.2 | 11.2 | 22 |
| Soy based bioplastic with polyester (II) | 11.2 | 0.2 | 33 | 34 |
| Soy based biocomposites with fibers (I) | 11.7 | 1.9 | 2 | 43 |
| Soy based biocomposites with fibers (II) | 14.7 | 2.3 | 2 | 43 |

Note:
(I), means Screw configuration I,
(II), means Screw configuration II

Through comparison of the mechanical properties of soy flour plastic, soy based bioplastic and soy based biocomposites processed with two different screw configurations, it was found that soy flour based plastics processed with screw configuration II had a higher tensile strength and produced homogenous pelletized samples. In addition, soy based bioplastic and soy based 30-wt % Indian grass reinforced biocomposites processed with screw configuration II had higher tensile elongation and tensile strength, respectively. This is because of the fact that screw configuration II had four kneading blocks, which led to better mixing of the soy flour and plasticizer which resulted in better dispersion of the plasticized soy flour in the soy based bioplastic. Additionally, this led to better fiber alignment in the composites and increased the fiber reinforcement efficiency so as to increase the tensile strength and modulus.

EXAMPLE 6

Wheat Straw (Smith, Adams & Associates LLC, Okemos, Mich.), Indian Grass and Rice Straw (Montana State University, Kalispell, Mont.) Reinforced Soy Based Biocomposites Soy flour was obtained from Archer Daniels Midland (ADM), Decatur, Ill. Glycerol was supplied by J.T. Baker Phillipsburg, N.J. Polyester amide was supplied by Bayer Corp., Pittsburgh, Pa. Soy flour based polyester amide bioplastic (soy based bioplastic) pellets were made in the Composites Materials and Structures Center, Michigan State University. Indian grass and wheat straw were used "as received" from Smith, Adams & Associates LLC, Okemos, Mich. Rice straw was from Montana State University.

The soy flour based bioplastic pellets were extruded with grass fiber under processing temperatures of 130° C. and a screw speed of 100 RPM. The feeding rates of soy flour based bioplastic and grass fiber were 30 g/min and 13 g/min, respectively. A Cincinnati Milacron Injection Molder with a capacity of 85 tons was used to manufacture specimens for measurement. Soy flour based bioplastic and biocomposites were injection molded with a barrel temperature of 130° C. and a mold temperature of 20° C. The tensile properties, flexural properties, and notched Izod impact strength of injection molded specimens were measured according to ASTM D638, ASTM D790, and ASTM D256, respectively. The results are shown in Table 5.

TABLE 5

Mechanical properties of grass fiber reinforced soy composites

| Composition Wt % | Tensile strength (MPa) | Tensile modulus (GPa) | Flexural strength (MPa) | Flexural modulus (GPa) | Notched Izod Impact strength (J/m) |
|---|---|---|---|---|---|
| 0-wt % | 11.2 | 0.2 | 11.0 | 0.2 | 34 |
| 30-wt % Indian grass | 14.7 | 2.3 | 25.8 | 2.4 | 43 |
| 30-wt % Wheat straw | 17.0 | 2.4 | 29.7 | 2.6 | 30.4 |
| 30-wt % Rice straw | 15.2 | 3.0 | 25.0 | 2.5 | 34 |

Note:
All sample processed with screw configuration II during fabrication.

It was found that wheat straw reinforced composites had a higher tensile and flexural strength, but lower impact strength as compared to Indian grass reinforced composites. Rice straw reinforced composites had a higher tensile modulus, but Indian grass reinforced composites had higher impact strength when compared to Indian grass reinforced composites. This indicates that these three grasses including Indian grass, wheat straw and rice straw reinforced soy composites had similar mechanical properties.

EXAMPLE 7

Soy Protein Plastic Chemical Modification with Functional Monomer

Soy flour was supplied by Archer Daniels Midland (ADM), Decatur, Ill. Glycidyl methacrylate (GMA), Maleic anhydride (MA), and Bis(tert-butyl peroxy)-2,5,-dimethyl hexane (Luprosal) were purchased from Aldrich, St. Louis, Mo. Styrene monomer (ST) was obtained from Kemlite Inc., Joliet, Ill. Glycerol was obtained from J.T. Baker Phillipsburg, N.J.

After drying, soy flour was blended with monomer (5-wt. % styrene or 5-wt. % GMA or 5-wt % MA/2-wt % styrene) and 1 wt. % initiator (Luprosal) for 20 min using a kitchen blender. Glycerol was then added as a plasticizer and mixed for 30 min. This was fed into the extruder, a ZSK-30 Werner and Pfeliderer Twin-screw Extruder (L/D=30) with six controllable zones, with zone temperatures of 95° C., 105° C., 115° C., 125° C., 130° C., and 130° C. and a screw speed of 100 RPM. Extruded samples of modified soy plastic were compression molded at a temperature of 125° C., a pressure of 42 psi for the first 10 min, and then a pressure of 167 psi for 5 min. The sample was kept under pressure until it cooled to 50° C. Compression-molded samples were then cut into specimens for mechanical properties measurement. The tensile properties and notched Izod impact strength of compression molded specimens were measured according to ASTM D638 and ASTM D256, respectively. The results are shown in Table 6.

TABLE 6

Mechanical properties of functional monomer modified soy flour based plastic

| Composition | Tensile strength (MPa) | Tensile modulus (GPa) | Tensile elongation (%) | Notched Izod Impact strength (J/m) |
|---|---|---|---|---|
| Raw | 3.0 | 0.2 | 3 | 22.3 |
| 5-wt % MA/2-wt % styrene | 3.4 | 0.2 | 4 | 10.7 |
| 5-wt % glycidyl methacrylate | 4.1 | 0.2 | 4 | 8.8 |
| 5-wt % styrene | 5.6 | 0.3 | 4 | 10.2 |

Note:
All sample processed with screw configuration I during fabrication.

The results indicate that the tensile strength of GMA and styrene modified soy flour were improved 40% and 80%, respectively. The modulus of styrene modified soy flour improved 50% compared with unmodified soy flour plastic. This is because of chemical interaction and in-situ polymerization between soy flour and polystyrene or poly (glycidyl methacrylate). Impact strength of GMA and styrene modified soy flour decreased by half, which may have been caused by the brittleness of polystyrene or poly (glycidyl methacrylate). The possible cause is that the styrene monomer is polymerized in situ in the presence of soy flour during processing. The other possible cause is that the soy protein molecular chain can break and form radicals, which supply a site to copolymerize with styrene monomer. Therefore, polystyrene was attached to the soy protein and formed styrene soy protein copolymer, which resulted in a higher strength and modulus. In addition, the in-situ formed styrene polymer or GMA polymer had good polar and nonpolar interaction with the soy protein molecule. XPS and FTIR support the conclusion that styrene and GMA became polymers and interacted with the soy flour based plastic.

EXAMPLE 8

Kenaf Fiber (Flaxcraft Inc., Cresskill, N.J.) and Hemp Fiber (HempLine, Ontario, Canada) Reinforced Soy Based Biocomposites Soy flour based polyester amide bioplastic (soy based bioplastic) pellets were made. Kenaf fiber and hemp fiber were from China and Canada.

The soy based bioplastic pellets were extruded with grass fiber under processing temperatures of 130° C. and a screw speed of 100 RPM. The feeding rates of soy based bioplastic and fiber were 30 g/min and 13 g/min, respectively. A Cincinnati Milacron Injection Molder with a capacity of 85 tons was used to manufacture specimens for measurement. Soy flour based bioplastic and biocomposites were injection molded with a barrel temperature of 130° C. and a mold temperature of 20° C. Injection molded standard specimens were obtained for mechanical and thermal testing. The tensile properties, flexural properties, and notched Izod impact strength of injection molded specimens were measured according to ASTM D638, ASTM D790, and ASTM D256, respectively. The results are shown in Table 7.

TABLE 7

Mechanical properties of natural fiber reinforced soy composites

| Composition Wt % | Tensile strength (MPa) | Tensile modulus (GPa) | Flexural strength (MPa) | Flexural modulus (GPa) | Notched Izod Impact strength (J/m) |
|---|---|---|---|---|---|
| 0-wt % | 11.2 | 0.2 | 11.0 | 0.2 | 34 |
| 30-wt % Hemp fiber | 27 | 2.6 | 38 | 2.6 | 39 |
| 30-wt % Kenaf fiber | 26 | 3.2 | 42 | 3.6 | 50 |

Note:
All sample processed with screw configuration II during fabrication.

The inclusion of hemp and kenaf fiber increased the tensile and flexural properties as well as impact strength. Tensile strength and modulus increased 1.4 times and 15 times for kenaf fiber reinforced composites compared to neat plastics. This indicates that these two fibers are good reinforcements for soy based bioplastics.

EXAMPLE 9

Modification of Polyester with Glycidyl Methacrylate and Blending with Soy Flour Plastic as a Compatibilizer Polyester amide (BAK1095) was supplied by Bayer Corp., Pittsburgh, Pa. Glycidyl methacrylate (GMA), and Benzyl peroxide were purchased from Aldrich, St. Louis, Mo. Soy protein plastic was from Example 11. Polyethylene grafted maleic anhydride (PE-g-MA) EPOLENE C16 from Eastman Chemical Co.

The modification of polyester amide with glycidyl methacrylate was conducted with a DSM Micro 15 twin-screw extruder (From Netherlands). Polyester amide, an initiator and glycidyl methacrylate were pre-mixed according to different ratios. The mixture was then fed into a DSM extruder with processing conditions of 140-160° C. temperature and 50-150 RPM screw speed. Reaction time was 3-5 min. After the extrudate sample was obtained, it was pelletized and put into a vacuum oven at 80° C. overnight. Differential scanning calorimeter (DSC), thermogravimetric analysis (TGA), and Fourier transform infrared spectrum (FTIR) were then used to characterize the structure of the modified polyester amide. This sample and PE-g-MA (10-wt %) were then used as a compatibilizer in the blending of soy flour plastic (50-wt %) and polyester amide (40-wt %) at 140° C. and a screw speed of 100 RPM with a 3 min processing time. Melted samples were then injection molded into a small mold to obtain specimens for mechanical properties measurement. The tensile properties and impact strength were measured according to ASTM D638 and D256 (the results are shown in Table 8).

TABLE 8

Mechanical properties of compatibilizer modified soy based bioplastic

| Composition | Tensile strength (MPa) | Tensile modulus (GPa) | Notched Izod Impact strength (J/m) |
|---|---|---|---|
| Raw | 12.6 | 0.3 | 36 |
| 10-wt % PEAGMA | 15.5 | 0.3 | 37 |
| 10-wt % PEMA | 10.1 | 0.2 | 43 |

Figure 17:
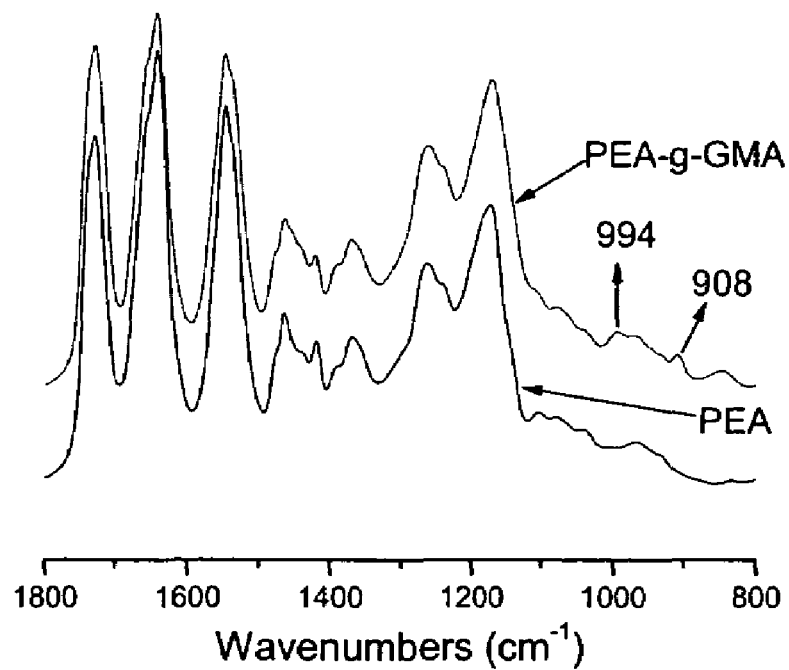
FIG. 17 is a graph showing FTIR curves of polyester amide (PEA) and polyester amide grafted glycidyl methacrylate (PEA-g-GMA).
Figure 18:
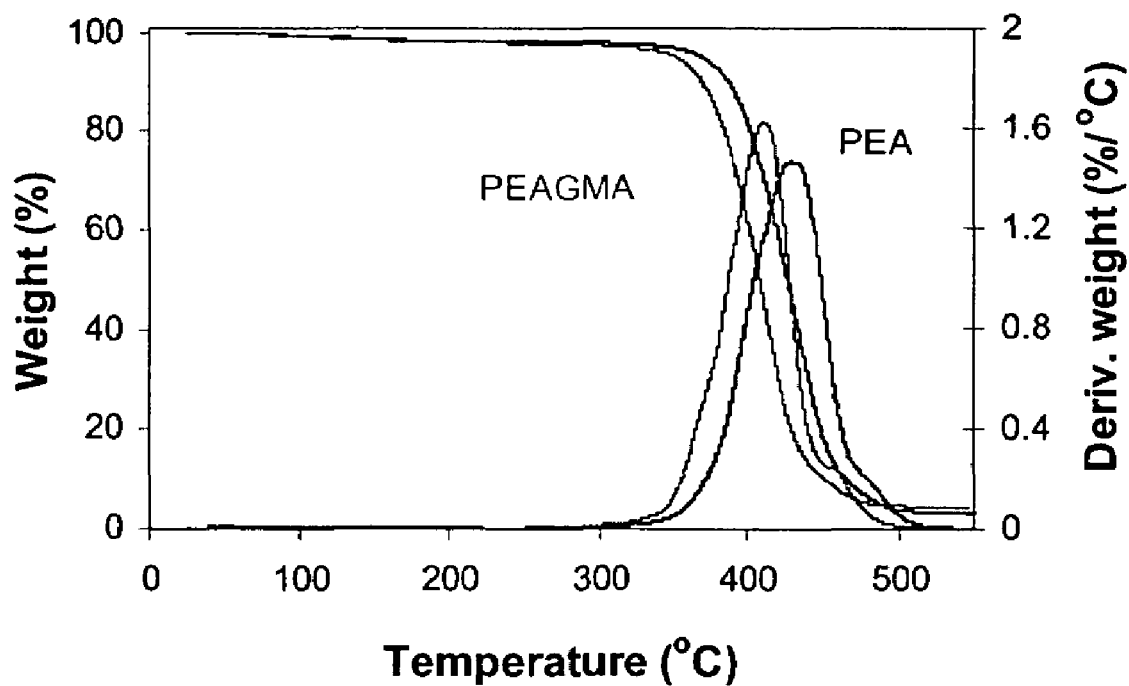
FIG. 18 is a graph showing TGA and DTG curves of polyester amide (PEA) and polyester amide grafted glycidyl methacrylate (PEA-g-GMA).
Figure 19:
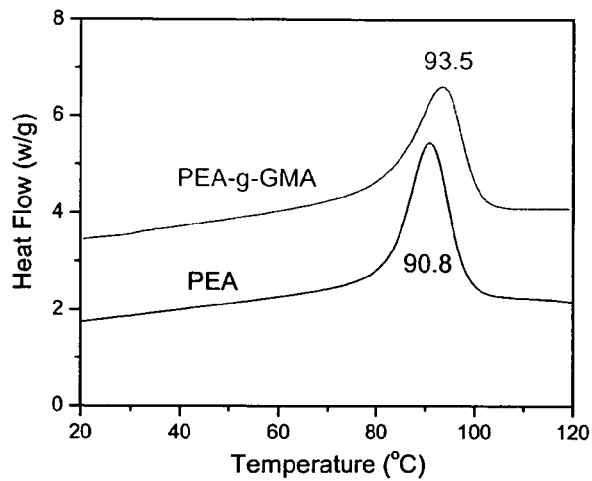
FIG. 19 is a graph showing DSC curves of polyester amide (PEA) and polyester amide grafted glycidyl methacrylate (PEA-g-GMA).

FTIR curves of pure and modified polyester amide are shown in FIG. 17. From the FTIR study of GMA modified Polyester amide, new peaks at 994 and 908 $cm^{-1}$ were found, which are the characteristic peaks of an epoxy ring. TGA curves (FIG. 18) show that at low temperature, there is no weight loss peak. This indicates that un-reacted monomers were removed by the previous treatment, namely vacuum oven heating because the monomer decomposes at a lower temperature. This also gives evidence to show that GMA grafted to the main chain of polyester amide. In addition, after grafting with GMA, the crystallization temperature increased (FIG. 19). This means that the grafting of GMA plays a role in causing a chemical nucleation effect during the crystallization of polyester amide.

It was found that PEA-g-GMA improved the tensile properties without decreasing the impact strength of soy based bioplastic. However, polyethylene grafted maleic anhydride was not a good interfacial agent because of the difference in polarity between polyester amide and polyethylene. This indicates that PEA-g-GMA was an excellent compatibilizer for soy flour plastic and polyester amide because the epoxy group of PEA-g-GMA may react with hydroxyl or amino groups of soy protein. Additionally, the polyester amide and PEA-g-GMA interacted through physical interpenetration between chain segments. Therefore, PEA-g-GMA enhanced interfacial adhesion between soy protein and polyester amide.

EXAMPLE 10

Figures 20A, 20B:
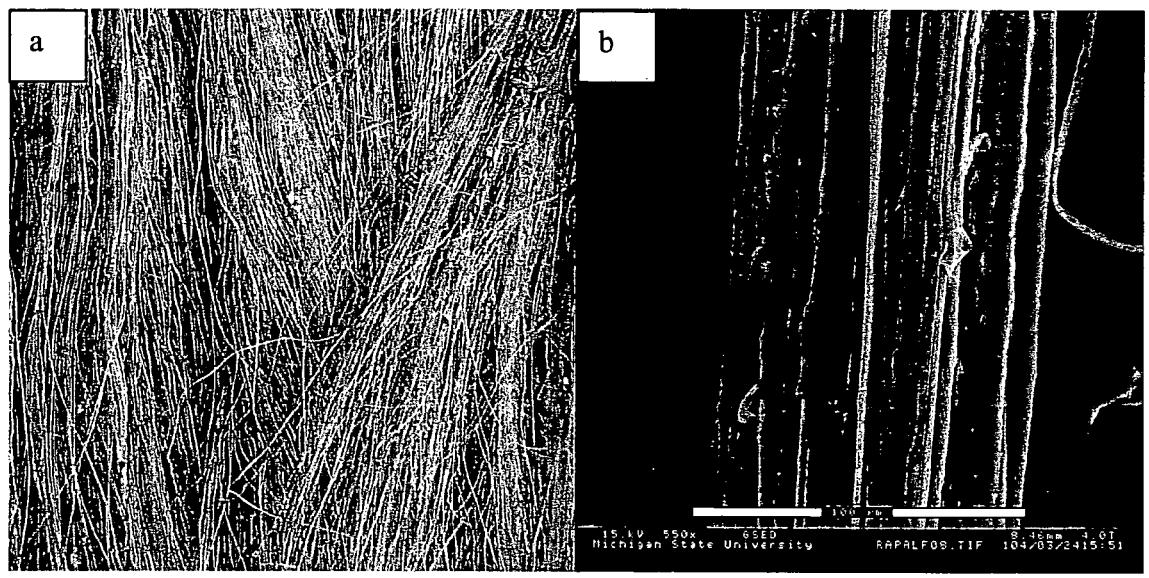
FIGS. 20A and 20B are pictures showing morphology of pineapple leaf fiber for (20A), digital picture (20B) ESEM picture.

Pineapple Leaf Fiber (SITRA, Coimbatore, India) Reinforced Soy Based Biocomposites Soy protein based polyester amide bioplastic (soy based bioplastic) pellets were made in the Composites Materials and Structures Center, Michigan State University. Pineapple leaf fiber (as shown in FIGS. 20A and 20B) was obtained from India.

Soy based bioplastic pellets were extruded with 15-wt %, 30-wt % pineapple leaf fiber (PALF) and 30-wt % fiber with the addition of 5-wt % PEA-g-GMA as a compatibilizer with a processing temperature of 130° C. and a screw speed of 100 RPM. The extruded samples were then pelletized. The bioplastic and PALF reinforced biocomposites were injection molded in an 85-ton Cincinnati-Milacron injection molder with a processing temperature of 130° C. Injection molded standard specimens were obtained for mechanical and thermal testing. The tensile properties, flexural properties, and notched Izod impact strength of injection molded specimens were measured according to ASTM D638, ASTM D790, and ASTM D256, respectively. The results are shown in Table 9.

Figures 21A, 21B:
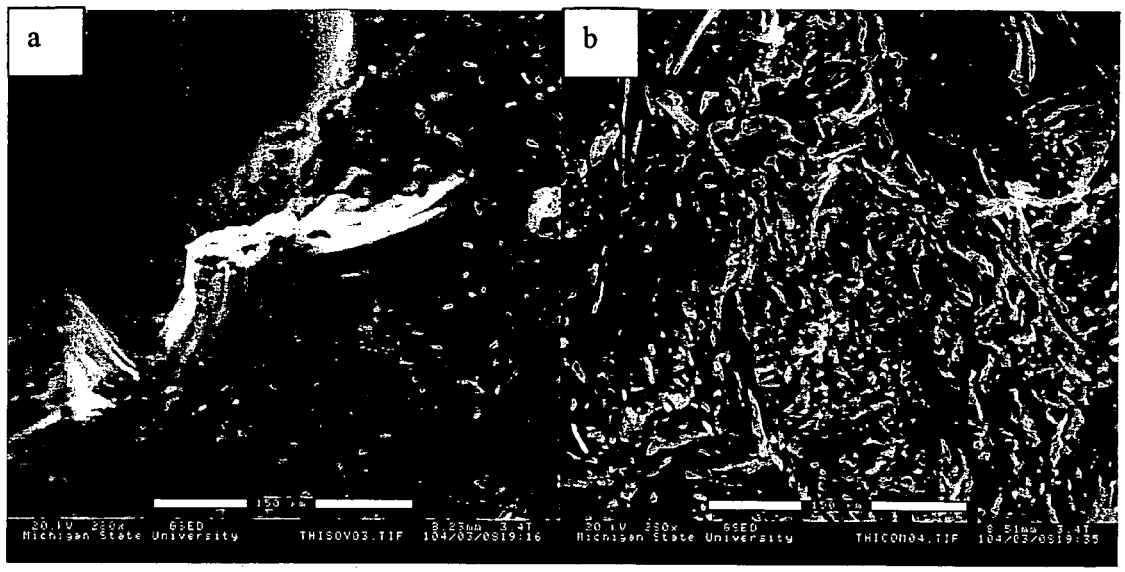
FIGS. 21A and 21B are ESEM micrographs for (a), 30 wt % pineapple leaf fiber soy composites and (b), 30 wt % pineapple leaf fiber with 5 wt % PEA-g-GMA soy composites.
Figure 22:
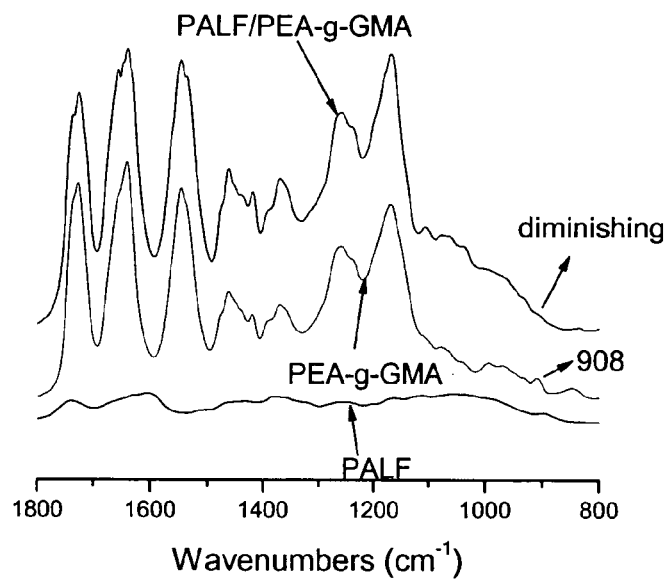
FIG. 22 is a graph showing FTIR of pineapple leaf fiber, polyester amide grafted glycidyl methacrylate and their blends.

It was found that tensile strength and modulus, flexural strength and impact strength increased with increasing PALF content. After adding the compatibilizer, mechanical properties increased further because of the improved dispersion of fiber in the matrix (as shown in FIGS. 21A and 21B). This indicates that PALF is a good reinforcement for soy based biocomposites and PEA-g-GMA is a good coupling agent for this system because the extent of fiber pullout and dispersion of the fiber in the matrix is improved. FTIR data (as shown in FIG. 22) supports the evidence of the interaction between the epoxy group in PEA-g-GMA and the hydroxyl group in the fiber.

TABLE 9

Mechanical properties of PALF fiber reinforced soy based composites

| Composition Wt % | Tensile strength (MPa) | Tensile modulus (GPa) | Flexural strength (MPa) | Flexural modulus (GPa) | Notched Izod Impact strength (J/m) |
|---|---|---|---|---|---|
| 0-wt % | 11.2 | 0.2 | 11.0 | 0.2 | 34 |
| 15-wt % | 26.3 | 2.9 | 36.0 | 2.2 | 37 |
| 30-wt % | 29.7 | 3.8 | 43.0 | 3.1 | 45 |
| 30-wt % + 5-wt % PEA-g-GMA | 33.3 | 4.1 | 48.4 | 3.5 | 52 |

Note:
All sample processed with screw configuration II during fabrication.

EXAMPLE 11

Compression Molding of Kenaf Reinforced Soy Based Biocomposites

Extruded samples of soy-based bioplastic of Example 10 were compression molded with a Carver Press SP-F 6030 held at a temperature of 135° C. Films were formed by compressing the specimens at a pressure of 156 psi for first 10 minutes followed by an increase to 624 psi for 5 minutes. The samples were kept at 624 psi until cooled to 50° C. The resulting compression-molded films had a thickness of 0.2 mm and were then cut into rectangular specimens of 2"×6" for composite preparation.

Soy based plastic films were put into a closed mold. Kenaf fibers with a predetermined length were placed between films. The amount of kenaf fibers placed between the films was kept constant. The closed mold containing the kenaf fiber and the matrix was compressed at 400 psi for the first 15 min followed by an increase in pressure to 2500 psi for 10 min at a temperature of 135° C. The sample was kept under pressure at 2500 psi until it cooled to 25° C. Compression-molded biocomposite samples were cut into rectangular specimens with different sizes for thermal and mechanical properties measurement. Heat deflection temperature (ASTM D648), dynamic mechanical properties and impact strength of these biocomposites (ASTM D256) were tested. The impact fracture surface of kenaf fiber reinforced soy based biocomposites was observed with Optical Microscopy (BH2) in a reflection mode.

The modulus at 25° C. for kenaf fiber reinforced soy based biocomposites is shown in Table 10. It was found that the modulus did not change with different processing methods. Increasing the fiber content from 30% to 50% increased the modulus of the biocomposites by approximately 100% for compression molded samples. Additionally, the modulus of the biocomposites increased with increasing the fiber length.

TABLE 10

Physical properties of kenaf fiber reinforced soy based biocomposites

| Sample | Molding type | kenaf fiber content (wt %) | Fiber length (mm) | Modulus (GPa) | HDT (° C.) | Notch Impact strength (J/m) | Fiber length on impact fracture surface (mm) |
|---|---|---|---|---|---|---|---|
| A | Injection | 30 | 6 | 2.9 | 96 | 50 | 0.2 |
| B | Compression | 33 | 6 | 3 | 116 | 92 | 0.8 |
| C | Compression | 55 | 2 | 4.6 | 131 | 125 | 0.7 |
| D | Compression | 56 | 6 | 5.9 | 148 | 184 | 1.2 |
| E | Compression | 57 | 50 | 6.2 | 152 | 289 | 2 |
| F | Compression | 54 | Long | 11 | >160 | 370 | 2.7 |

The heat deflection temperature (HDT) showed a significant increase of about 36° C. because of the processing methods. HDT also increased with increasing fiber content as well as length, reflecting the dependence of the modulus on these variables. The impact strength of compression molded biocomposites was higher than that of the injection molded samples. This indicates that compression molding can achieve a better impact strength for fiber-reinforced composites. Injection molded samples should exhibit a reduced fiber bridging effect because of fiber damage caused by extrusion and injection molding. On the contrary, compression molding processing did not damage fiber properties and a higher bridging effect is observed. Thus, a greater extent of fiber pullout is expected for compression-molded specimens. Here, the extent of fiber pullout can be characterized with fiber length on the impact fracture surface (as shown in Table 10). When impact strength was correlated with fiber length on the impact fracture surface, it could be concluded that impact strength increased with fiber length. This result further demonstrates that the fiber-bridging effect dominated the impact strength of fiber reinforced composites.

COMPARATIVE EXAMPLE 12

Figure 23A:
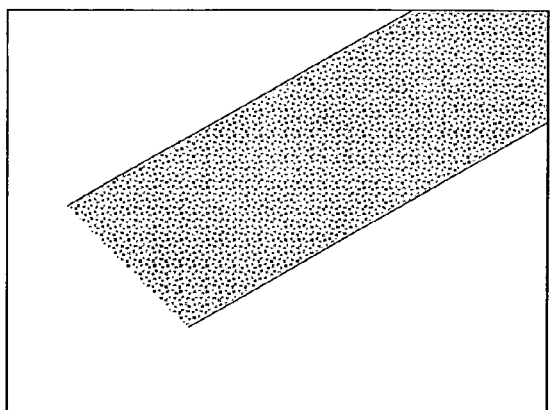
FIGS. 23A and 23B show veil materials from SMC run of 50-wt % big blue stem grass fiber/50-wt % HDPE.
Figure 23B:
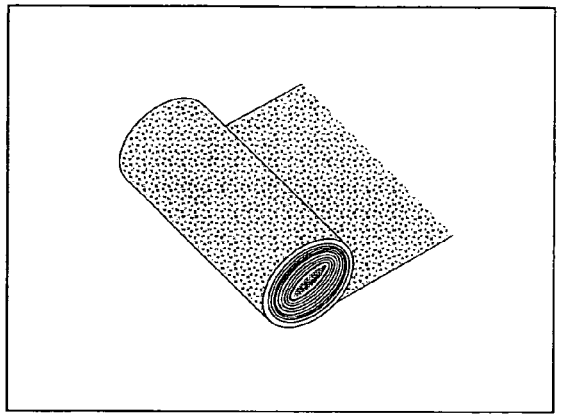

SMC Processing of Big Blue Stem Grass (Smith, Adams & Associates LLC, Okemos, Mich.) Fiber/Thermoplastic Powder H.D.P.E. Biocomposites A formulation of 50 wt % big blue stem grass fiber to 50 wt % FA-709-00 polyethylene powder was used. For this run, a suspension of 50 wt % powder to 50 wt % DI water was used for the first time. Previous attempts used 35 wt % powder to 65 wt % DI water and because of the high water %, difficulties were experienced with evaporating all of the water and thoroughly melting the polymer. Formulation calculations based on line speed are shown in Table 11. The infrared heater bank temperature was set to 645 deg F. which is 55 deg F. cooler than previous runs to help reduce scorching evident on earlier trials. Approximately 15 feet each of the veil material was produced (see FIGS. 23A and 23B).

Figure 24:
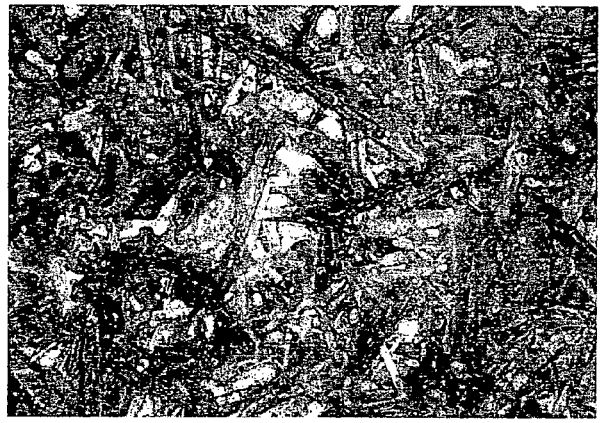
FIG. 24 is a photographic macroscopic image of big blue stem grass fiber/HDPE veil material from SMC run (top of the veil material—magnification 10×).

All water was evaporated from the veil material by the IR heater bank and the polyethylene powder was thoroughly melted well before reaching the last heater. There was no evident scorching of the fibers by the infrared heaters. Product from this run had good tear strength and released very well from the Teflon belt. It appeared that the higher concentration of polymer in suspension did not completely wet out small fibers on the Teflon belt side of the veil material. This left a thin dry dust layer that promoted release from the belt. This also helped with cleaning the belt because polymer was not allowed to contact it. FIG. 24 shows veil material produced using the spray nozzles and Equistar FA 709-00 polyethylene. It appears that the use of the spray nozzles does in fact help to pull the polymer to the fibers. This shows that SMC can be used to produce big blue stem grass fiber/ HDPE powder veil materials.

1 run was conducted using the following parameters:
Line speed—Dial setting of 0.8=0.2 in/sec=12 in/min
K-tron twin screw feeder—Lo gear with a digital readout setting of 500 RPM
Air pressure for the rotary ball vibrator on the fiber distribution chute was set to 75 psi
Vibratory feeder dial setting—100%
Biofiber output measured to be 12.0 g/min+−0.325 g/min over 12" wide area
Infrared heater controller set to 645 deg F.
Heater height above Teflon belt surface: 5.75"
Peristaltic pump setting—10 ml/min (23.7 g suspension/min (approx. 11.85 g of PE powder/min)
Air nozzle air pressure set to 18 psi
Grip assembly used with slight preload on roller for friction Experimental Procedure A total of 2400 g of polyethylene suspension was mixed shortly before the SMC run using the following formulation:

| | |
|---|---|
| 50% D.I. H2O | 1200 g |
| 50% Equistar FA 709-00 Polyethylene Powder | 1200 g |

For both runs, the materials were weighed in a 4000 ml beaker and mixed by hand. The mixture was then put through a 600 um sieve to remove any clumped material. Clumps were manually broken down by hand by forcing through the sieve. The suspension was then placed in the beaker on a stirring hot plate to keep the polymer agitated and in suspension.

The vibratory feeder was calibrated by placing a 12" wide aluminum foil pan underneath the discharge slot to collect fiber. Fiber was collected for 2 minutes and was weighed to determine the feed rate in g/min. The feed rate was adjusted as required and the fiber output was weighed again. This was repeated until the output rate was within 10% of target. The nozzles were calibrated in the same manner.

The infrared heaters were turned on several hours before the run and were ramped up approximately 200 deg F. per hour until the target temperature of 645 deg F. was reached. This allows the steel surface plate on the SMC line to equilibrate. Heating this plate too fast results in a "sprung" plate caused by differential expansion rates on the two sides.

TABLE 11

SMC RUN of BBSGF/HDPE FORMULATION CALCULATIONS BASED ON LINE SPEED

| Line Speed (in/s) | Fiber Dry Density (g/sq in) | Polymer Content (%) | PE Content In H2O Suspension (%) | Total Veil Weight (g/min) | Polymer Weight (g/min) | Fiber Weight (g/min) | Water Weight (g/min) | Total Suspension Weight (g/min) | Total Suspension Weight per Nozzle (g/min) |
|---|---|---|---|---|---|---|---|---|---|
| 0.1 | 0.083 | 50.00% | 50.00% | 11.952 | 5.976 | 5.976 | 5.9760 | 11.9520 | 2.9880 |
| 0.2 | 0.083 | 50.00% | 50.00% | 23.904 | 11.952 | 11.952 | 11.9520 | 23.9040 | 5.9760 |
| 0.3 | 0.083 | 50.00% | 50.00% | 35.856 | 17.928 | 17.928 | 17.9280 | 35.8560 | 8.9640 |
| 0.4 | 0.083 | 50.00% | 50.00% | 47.808 | 23.904 | 23.904 | 23.9040 | 47.8080 | 11.9520 |
| 0.5 | 0.083 | 50.00% | 50.00% | 59.760 | 29.880 | 29.880 | 29.8800 | 59.7600 | 14.9400 |
| 0.6 | 0.083 | 50.00% | 50.00% | 71.712 | 35.856 | 35.856 | 35.8560 | 71.7120 | 17.9280 |
| 0.7 | 0.083 | 50.00% | 50.00% | 83.664 | 41.832 | 41.832 | 41.8320 | 83.6640 | 20.9160 |
| 0.8 | 0.083 | 50.00% | 50.00% | 95.616 | 47.808 | 47.808 | 47.8080 | 95.6160 | 23.9040 |
| 0.9 | 0.083 | 50.00% | 50.00% | 107.568 | 53.784 | 53.784 | 53.7840 | 107.5680 | 26.8920 |
| 1 | 0.083 | 50.00% | 50.00% | 119.520 | 59.760 | 59.760 | 59.7600 | 119.5200 | 29.8800 |

Once the heaters were up to temperature, the SMC line was turned on and was followed by the fiber distribution chute, rotary ball vibrator, vibratory feeder, and finally the K-tron screw feeder. The spray nozzles were then turned on. The process was allowed to run for 15 minutes. Approximately 15 ft of veil material was produced.

COMPARATIVE EXAMPLE 13

Compression Molding of 50% Grass/HDPE Biocomposites from the SMC Line

HDPE/big blue stem grass (50-wt %/50-wt %) sheet composites were made with the SMC process as described previously. 6"×2" samples were cut from the grass/HDPE sheet composites made on the SMC line. Ten layers were stacked into a matched closed mold, then compressed to 400 psi for 15 min followed by an increase in pressure as shown in table 12 for 10 min at a temperature of 190° C. The sample was kept under pressure until it cooled to 25° C. A dynamic mechanical analyzer (2980 DMA, TA instruments, USA) was used to measure dynamic mechanical properties of HDPE/grass biocomposites. The consolidation state of the final composite samples was characterized with a Phillips Electroscan 2020 environmental scanning electron microscope (ESEM).

The storage modulus at 25° C. and the density of HDPE/grass composites is shown in Table 12. The composites fabricated using the picture frame mold had low stiffness even at high pressures (sample B) compared to the injection molded specimen (sample G). In contrast, the composites fabricated with the closed matched mold had a high stiffness similar in value to the injection molded specimen. Among the samples fabricated with the closed mold, the order of increasing stiffness was sample C<D<E=F, indicating that the stiffness of the composites increased with increasing mold pressure. Stiffness plateaued at 1500 psi and 190° C. (sample E). By optimizing processing conditions and mold type, composites processed with compression molding from SMC sheet material achieved similar stiffness values to injection molding specimens made from pelletized extrudate.

The stiffness of the composite is closely related to the density, which reflects the consolidation state of the composite. Sample A and B in Table 12 had a lower stiffness and a lower density because of poor consolidation which is obvious as voids in E.S.E.M. micrographs (FIGS. 25A and 25D). On the other hand, sample E and F in Table 12 had almost the same stiffness as sample G because of good consolidation which is evidenced by a lack of voids in E.S.E.M. micrographs (FIGS. 25C and 25D). It is clear from these micrographs that the higher pressures effectively pack the fiber and matrix and produce a composite with a higher density and significantly improved mechanical properties.

TABLE 12

Modulus and density of HDPE/grass composites from SMC

| Sample | Molding condition | Mold type | Modulus (GPa) | Density (g/cm³) |
|---|---|---|---|---|
| A | Compression molded at 150 psi/190° C. | Frame mold | 1.6 | 0.71 |
| B | Compression molded at 3000 psi/190° C. | Frame mold | 1.9 | 0.86 |
| C | Compression molded at 500 psi/190° C. | Closed mold | 3.3 | 1.04 |
| D | Compression molded at 1000 psi/190° C. | Closed mold | 4.1 | 1.07 |
| E | Compression molded at 1500 psi/190° C. | Closed mold | 4.7 | 1.11 |
| F | Compression molded at 2000 psi/190° C. | Closed mold | 4.6 | 1.11 |
| G | Injection molded | | 4.8 | 1.11 |

COMPARATIVE EXAMPLE 14

SMC Processing of Big Blue Stem Grass Fiber/Cellulose Acetate Butyrate Biocomposites A formulation of 50 wt % big blue stem grass fiber to 50 wt % Eastman CAB-381-20 cellulose acetate butyrate was used. Formulation and line speed calculations were based on the powder curtain feeder output rate and are shown in Table 13. A heater bank temperature of 700 deg was used. Veil surface temperature was measured with an Omega Omegascope Model OS520 Series optical pyrometer and was found to be between 485 and 493 deg F.

The powder curtain feeder worked flawlessly. The powder distribution over the width of the fiber matt appeared uniform and the output rate appeared consistent. There was some visible scorching of the fibers by the infrared heaters as well as some areas of partially melted CAB near the edges of the veil material. Product from this run had good tear strength and released very well from the Teflon belt.

TABLE 13

FORMULATION AND LINE SPEED CALCULATIONS BASED ON POWDER CURTAIN FEEDER OUTPUT RATE

| Powder Curtain Feeder Output (g/min) | Fiber Dry Density (g/sq/in) | Polymer Content (%) | Fiber Weight (g/min) | Total Veil Weight (g/min) | Line Speed Speed (in/s) |
|---|---|---|---|---|---|
| 13.638 | 0.083 | 50.00% | 13.638 | 27.276 | 0.23 |

1 run was conducted using the following parameters:
Line speed—Dial setting of 1.05=0.23 in/sec=13.8 in/min
K-tron twin screw feeder—Lo gear with a digital readout setting of 700 RPM
Air pressure for the rotary ball vibrator on the fiber distribution chute was set to 75 psi
Vibratory feeder dial setting—100%
Biofiber output measured to be 13.75 g/min+−0.12 g/min over 12" wide area
Infrared heater controller set to 700 deg F.
Heater height above Teflon belt surface: 5.75"
Veil surface temperature between 485 and 493 deg F.
Powder curtain feeder controller setting/volumetric mode—100%
Powder curtain output measured to be 13.638 g/min+− 0.638
Powder curtain feeder electromagnetic vibrator on
Grip assembly used with slight preload on roller for friction Experimental Procedure The powder curtain feeder controller was set to 100% in volumetric mode and output was measured by centering a 12" wide aluminum foil pan underneath the discharge holes. Powder was collected for 4 minutes and was weighed to determine the feed rate in g/min. This was repeated to verify the initial measurement. The bio-feeder was calibrated by placing a 12" wide aluminum foil pan underneath the discharge slot of the vibratory feeder to collect fiber. Fiber was collected for 2 minutes and was weighed to determine the feed rate in g/min. The feed rate on the K-tron feeder was adjusted as required and the fiber output was weighed again. This was repeated until the output rate was within 10% of target.

The infrared heaters were turned on several hours before the run and were ramped up approximately 200 deg F. per hour until the target temperature of 700 deg F. was reached. This allows the steel surface plate on the SMC line to equilibrate. Heating this plate too fast results in a "sprung" plate caused by differential expansion rates on the two sides.

Once the heaters were up to temperature, the SMC line was turned on and was followed by the fiber distribution chute, rotary ball vibrator, vibratory feeder, and finally the K-tron screw feeder. The powder curtain feeder was then turned on. Approximately 40 feet of veil material was produced. This demonstrates that veil material can be made with big blue stem grass fiber and cellulose acetate butyrate (CAB) (Eastman Chemical Company, Kingsport, Tenn.) using a SMC line.

COMPARATIVE EXAMPLE 15

Physical Properties of Natural Fiber/CAB Biocomposites from SMC

Cellulose acetate butyrate (CAB381-20) (butyryl content of 37% and acetyl content of 13.5%) with a Tg of 141° C. was obtained from Eastman Chemical. Big blue stem grass was obtained from Smith, Adams & Associates LLC. CAB/big blue stem grass (50-wt %/50-wt %) sheet composites were made in the Composite Materials and Structures Center by sheet molding compounding methods as described previously. 6"×2" samples were cut from grass/polyethylene sheet composites produced on the SMC line. Ten layers were placed into a closed mold and compression molded at 400 psi for first 15 min followed by an increase to 2000 psi for 10 min. The temperature was held at 195° C. The sample was then kept under pressure until it cooled to 25° C.

A comparison of the physical properties of compression molded SMC samples to samples injection molded from pelletized extrudate is shown in Table 14. Modulus values of samples from the SMC process are essentially equal to the injection molded samples from extrusion. The impact strength of compression molded samples from the SMC process is higher than that of injection molded samples. Also, at elevated temperatures, the modulus of compression molded samples is higher than that of injection molded samples. This suggests that the modulus decrease rate of compression-molded samples is lower than that of injection molded samples, which is evidenced by the fact that compression molded samples had higher HDT values than the injection molded samples.

TABLE 14

Composition and physical properties of BBSGF/soy fiber biocomposites

| Sample | Molding condition | Resource | Modulus (GPa) | Impact strength (J/m) | HDT (° C.) |
|---|---|---|---|---|---|
| A | Injection molded HDPE/BBSG composites | Extrusion pellets | 4.8 | 45 | 120 |
| B | Compression molded HDPE/BBSG composites | SMC sheet materials | 4.7 | 65 | 133 |
| C | Compression molded CAB/BBSG composites | SMC sheet materials | 5.0 | 44 | 140 |

The dynamic modulus of the CAB/grass composite was found to be higher than that of HDPE/grass composites made using the SMC process as shown in Table 14. However, the CAB/grass composites had lower impact strength and similar HDT compared to the HDPE/grass composites. Impact strength of the CAB/grass was, however, essentially equivalent to that of the injection molded sample. These results indicate that SMC and subsequent compression molding processing is a viable processing method for manufacturing fully biobased biocomposites with comparable performance to common plastic composites from cellulose acetate butyrate bioplastic and grass biofibers.

EXAMPLE 16

Soy Based Biofiber Preparation from Soy Based Bioplastic

Soy based bioplastic pellets (Example 6) made in the Composite Materials and Structures Center lab with a Werner and Pfleiderer twin screw extruder and separate pelletizing machine were fed into a DSM Micro15 twin-screw extruder. Material was extruded through a custom made die with multiple holes to allow several fiber strands to be simultaneously made. Fiber was wound onto a servo motor controlled take up reel which allowed for an automated fiber manufacturing process. A barrel temperature of 130° C. and a screw speed of 100 rpm were used. Residence time of the soy based bioplastic in the DSM was 43 s.

Figure 26:
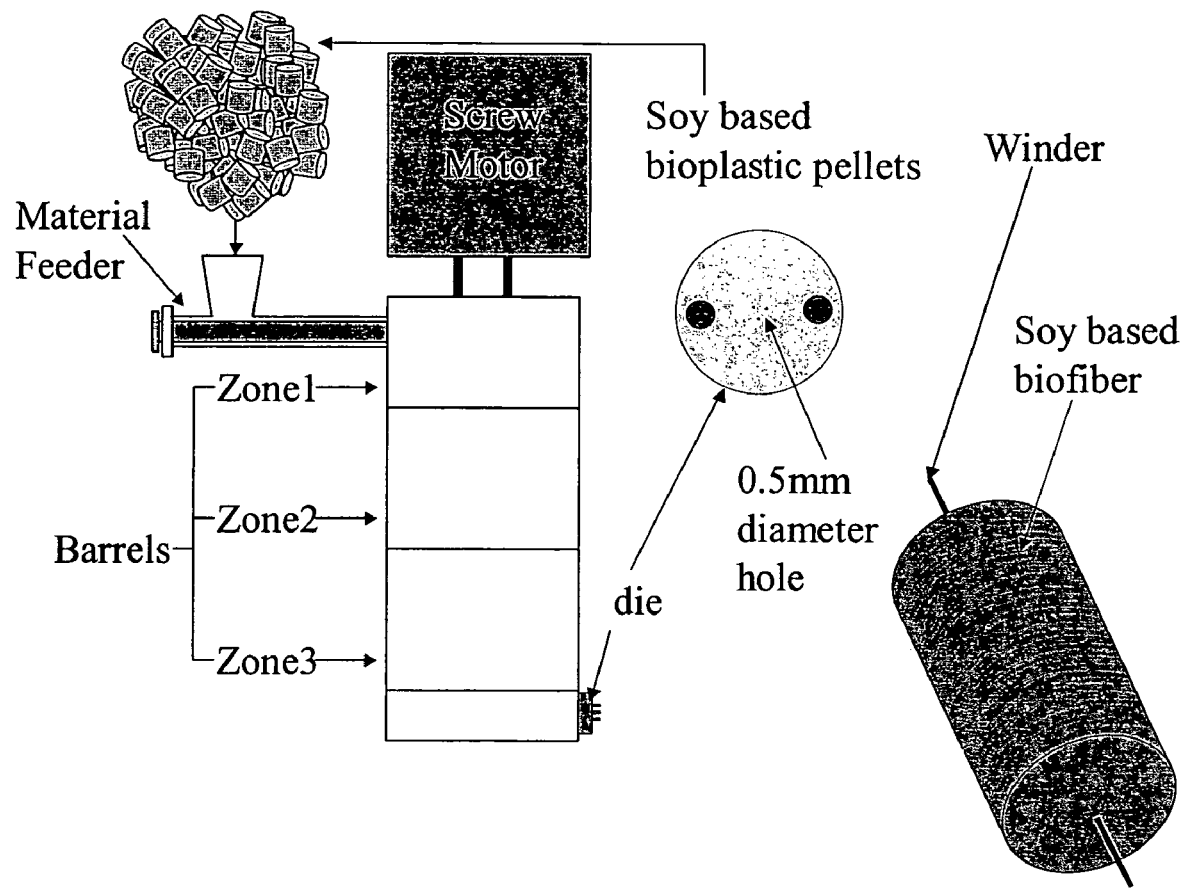
FIG. 26 is a schematic drawing showing processing of soy based biofiber.

FIG. 26 shows the soy based biofiber process using the DSM extruder. The diameter of the soy based biofiber was between 250-450 μm. The production rate of soy based biofiber was approximately 100 g/hour. This process demonstrates the ability to convert soy based bioplastic into soy based biofiber through extrusion.

EXAMPLE 17

SMC Fabrication of Big Blue Stem Grass Fiber/Soy Plastic Fiber Biocomposites

A run was conducted using a formulation of 60 wt % soy flour based (Example 16) plastic fiber, 30 wt % big blue stem grass fiber and 10 wt % Celvol 205™ PVOH (Celanese Corporation, Dallas, Tex.) (Polyvinyl alcohol with ethanol) which is a binder. A dry fiber density of 0.166 g/in$^2$ was used. The big blue stem grass and soy plastic fiber were premixed by hand and was fed onto the line using the vibratory feeder (FIGS. 4 and 5). The PVOH binder was applied with the spray nozzles (FIG. 4). Output rate calculations based on line speed and product formulation is shown in Table 15. A line speed of 0.2 in/sec and a heater bank temperature of 550 deg F. were used. Several feet of materials were produced.

Minimal separation of big blue stem grass fiber and soy plastic fiber was observed in the feeder system and distribution on the carrier belt appeared uniform. Product from the SMC run was good and could be removed from the Teflon sheet. Tear strength was fairly good. The above results demonstrated that the bio-composite veil material from big blue stem grass fiber, soy plastic fiber, and PVOH as a binder has been successfully fabricated with SMC processing.

TABLE 15

BBSGF/SOY FIBER OUTPUT RATE CALCULATION BASED ON LINE SPEED AND PRODUCT FORMULATION

| Line Speed (in/s) | Soy Fiber/BBSGF Blend Dry Density (g/sq in) | PVOH Content (%) | PVOH In H2O Suspension (%) | Total Veil Weight (g/min) | PVOH Weight (g/min) | Fiber Weight (g/min) | Water Weight (g/min) | Total Suspension Weight (g/min) | Total Suspension Weight per Nozzle (g/min) |
|---|---|---|---|---|---|---|---|---|---|
| 0.1 | 0.166 | 10.00% | 10.00% | 13.280 | 1.328 | 11.952 | 11.9520 | 13.2800 | 3.3200 |
| 0.2 | 0.166 | 10.00% | 10.00% | 26.560 | 2.656 | 23.904 | 23.9040 | 26.5600 | 6.6400 |
| 0.3 | 0.166 | 10.00% | 10.00% | 39.840 | 3.984 | 35.856 | 35.8560 | 39.8400 | 9.9600 |

TABLE 15-continued

BBSGF/SOY FIBER OUTPUT RATE CALCULATION BASED ON LINE SPEED AND PRODUCT FORMULATION

| Line Speed (in/s) | Soy Fiber/BBSGF Blend Dry Density (g/sq in) | PVOH Content (%) | PVOH In H2O Suspension (%) | Total Veil Weight (g/min) | PVOH Weight (g/min) | Fiber Weight (g/min) | Water Weight (g/min) | Total Suspension Weight (g/min) | Total Suspension Weight per Nozzle (g/min) |
|---|---|---|---|---|---|---|---|---|---|
| 0.4 | 0.166 | 10.00% | 10.00% | 53.120 | 5.312 | 47.808 | 47.3080 | 53.1200 | 13.2800 |
| 0.5 | 0.166 | 10.00% | 10.00% | 66.400 | 6.640 | 59.760 | 59.7600 | 66.4000 | 16.6000 |

Experimental Run Parameters 1 run was conducted using the following parameters:
  Line speed—Dial setting of 1.00=0.198 in/sec=11.9 in/min
  K-tron twin screw feeder—Lo gear with a digital readout setting of 600 RPM
  Air pressure for the rotary ball vibrator on the fiber distribution chute was set to 75 psi
  Vibratory feeder dial setting—100%
  Biofiber output measured to be 25.0 g/min over 12" wide area
  Infrared heater controller set to 550 deg F.
  Heater height above Teflon belt surface: 5.75"
  Peristaltic pump setting—10.0 ml/min (26.0 g PVOH solution/min)
  Air nozzle air pressure set to 18 psi
  Grip assembly used with slight preload on roller for friction Experimental Procedure A total of 2000 g of Celvol 205™ PVOH solution was mixed shortly before the SMC run using the following formulation:

| 10% PVOH | 200 g |
| 90% D.I. H2O | 1800 g |

The materials were weighed in a 4000 ml beaker and mixed by hand. The solution was then transferred to the peristaltic pump.

A total of 1800 g of big blue stem grass fiber and extruded soy plastic fiber was mixed shortly before the SMC run using the following formulation:

| 33% Big Blue Stem Grass Fiber | 600 g |
| 66% Extruded Soy Fiber | 1200 g |

Extruded soy fiber consisted of 50 wt % plasticized soy fiber (Example 16) (30 wt % glycerol) and 50 wt % polyesteramide. The materials were weighed in a 3 gal bucket and mixed by hand. Blended fiber was then placed in the K-tron feeder hopper.

The vibratory feeder was calibrated by placing a 12" wide aluminum foil pan underneath the discharge slot to collect fiber. Fiber was collected for 2 minutes and was weighed to determine the feed rate in g/min. The feed rate was adjusted as required and the fiber output was weighed again. This was repeated until the output rate was within 10% of target. The nozzles were calibrated in the same manner.

The infrared heaters were turned on several hours before the run and were ramped up approximately 200 deg F. per hour until the target temperature of 550 deg F. was reached. This allows the steel surface plate on the SMC line to equilibrate. Heating this plate too fast results in a "sprung" plate caused by differential expansion rates on the two sides.

Once the heaters were up to temperature, the SMC line was turned on and was followed by the fiber distribution chute, rotary ball vibrator, vibratory feeder, and finally the K-tron screw feeder. The spray nozzles were then tuned on when the fiber matt reached them. The process was allowed to run to produce sheet product for evaluation.

EXAMPLE 18

Compression Molding Biocomposites from Grass Fiber and Soy Based Biofiber

Soy based biofiber/big blue stem grass (Examples 16 and 17) with 10% PVOH sheet composites were made using the SMC process. 6"×2" samples were cut from grass/HDPE sheet composites produced using the SMC line. Twelve layers were stacked into a matched closed mold, then compression molded at 400 psi for first 15 min followed by an increase in pressure to either 2500 psi, 2800 psi or 3000 psi for 10 min at a temperature of 135° C. The samples were kept under pressure until cooled to 25° C.

Soy based bioplastic fiber was mixed with big blue stem fiber to a ratio of 30:70, 40:60, and 50:50, respectively. Composites were formed by compression molding the specimens at a pressure of 156 psi for first 20 minutes followed by an increase to 624 psi for 15 minutes at a temperature of 135° C. Six layers of the premade composites were then put into a closed compression mold to make composites according to the above procedure.

Heat deflection temperature (ASTM D648), dynamic mechanical properties and impact strength of these biocomposites (ASTM D256) were tested. The physical properties of big blue stem grass fiber reinforced soy based biocomposites with and without PVOH is shown in Table 16. The modulus, impact strength and HDT of biocomposites fabricated with 10% PVOH increased with increasing big blue stem grass fiber content. Biocomposites with 50% grass fiber, 10% PVOH, and 40% soy based biofiber had a modulus of 4.7 GPa, an impact strength of 82 J/m, and a HDT of 116° C. Similarly, composites without PVOH exhibited the same trends. It appears that PVOH works as a toughening agent for grass fiber reinforced soy based biocomposites. The biocomposites with 50% grass fiber and 50% soy based biofiber had modulus of 3.6 GPa, impact strength of 55 J/m and a HDT of 108° C. Additionally, biocomposites fabricated using 10% PVOH had a higher modulus than these composites without PVOH. This means that PVOH not only plays a role of binder during processing but also works as a reinforcement to improve the modulus. The HDT did not change with the addition of PVOH. The consolidation of the composites was improved with adding PVOH, which indicates that PVOH works as a coupling agent to help remove the gap between the soy matrix and the grass fiber. The results demonstrate that PVOH can act as a bonding agent in the processing of grass fiber reinforced soy fiber biocomposites and results in the significant improvement in the physical properties of the final product.

TABLE 16

Composition and physical properties of BBSGF/soy fiber biocomposites

| Sample | Soy based biofiber (wt %) | BBSGF (wt %) | PVOH (wt %) | Modulus (GPa) | HDT (° C.) | Notch Impact strength (J/m) |
|---|---|---|---|---|---|---|
| A | 70 | 30 | 0 | 2.3 | 56 | 85 |
| B | 60 | 40 | 0 | 3.1 | 57 | 94 |
| C | 50 | 50 | 0 | 3.6 | 55 | 108 |
| D | 60 | 30 | 10 | 2.9 | 62 | 88 |
| E | 50 | 40 | 10 | 4.1 | 77 | 99 |
| F | 40 | 50 | 10 | 4.7 | 82 | 116 |

The process provides a treatment wherein the natural fiber is treated with a surface treatment selected from the group consisting of alkali treatment, saline treatment, functional monomer treatment, surfactant treatment and coupling agent treatment. Preferably, the natural fiber is treated with a functional monomer selected from the group consisting of maleic anhydride, glycidyl methacrylate, acrylate acid and succinate acid. Preferably, the natural fiber is treated with a coupling agent and wherein the coupling agent is a functional monomer modified polymer. Preferably, the natural fiber is treated with a functional polymer selected from the group consisting of polyester amide, polycaprolactone, poly (tetramethylene adipate-co-terephthalate), polybutylene adipate/terephthalate, polybutylene succinate and polybutylene succinate adipate.

We claim:

1. A process for the preparation of a polymer and a natural fiber composition, which comprises:
   (a) providing a mixture of a vinyl monomer and a dried soy flour comprising proteins and carbohydrates with an initiator for the polymerization of the vinyl monomer selected from the group consisting of styrene, glycidyl methacrylate and mixtures thereof;
   (b) first extruding the mixture of step (a) at a temperature so that a vinyl polymer is formed from the vinyl monomer and grafted on the soy flour with a plasticizer; and
   (c) second extruding a dried thermoplastic, biodegradable polyester polymer and a natural fiber in the mixture of step (b) to form the polymer and natural fiber composition.

2. The process of claim 1 wherein the extruding is in an extruder with heated zones inside the extruder between about 95° C. and 135° C.

3. The process of claims 1 or 2 wherein the vinyl monomer is mixed with maleic anhydride, which reacts with the soy flour.

4. The process of claims 1 or 2 wherein the vinyl polymer is between about 1 and 20 weight percent of the composition.

5. The process of claim 1 wherein the polyester polymer is poly(tetramethylene adipate-co-terephthalate).

6. The process of claim 1 wherein the polyester polymer is a polyester amide.

7. The process of claims 1 or 2 wherein the natural fiber is selected from the group consisting of kenaf, flax, jute, hemp, sisal, corn stalk, rice stalk and grass fiber.

8. The process of claim 7 wherein a surface of the natural fiber is in addition reacted with a functionalized polymeric compatibilizer.

9. The process of claim 7 wherein the natural fiber is selected from the group consisting of Indian grass, big blue stem, little blue stem, switch grass, corn stalk, rice straw, wheat straw and other plant grass.

10. The process of claim 1 or 2 wherein a surface of the natural fiber is pretreated with a surface treatment selected from the group consisting of alkali treatment, saline treatment, functional monomer treatment, surfactant treatment and coupling agent treatment.

11. The process of claim 1 or 2 wherein a surface of the natural fiber is pretreated with a functional monomer selected from the group consisting of maleic anhydride, glycidyl methacrylate, acrylate acid and succinate acid.

12. The process of claim 1 or 2 wherein a surface of the natural fiber is pretreated with a coupling agent and wherein the coupling agent is a functional monomer modified polymer.

13. The process of claim 1 or 2 wherein a surface of the natural fiber is pretreated with a functional polymer selected from the group consisting of polyester amide, polycaprolactone, poly(tetramethylene adipateco-terephthalate), polybutylene adipate/terephthalate, polybutylene succinate and polybutylene succinate adipate.

14. The process of claim 1 wherein the flour is defatted.

* * * * *

UNITED STATES PATENT AND TRADEMARK OFFICE
CERTIFICATE OF CORRECTION

PATENT NO. : 7,576,147 B2
APPLICATION NO. : 11/212241
DATED : August 18, 2009
INVENTOR(S) : Lawrence T. Drzal et al.

It is certified that error appears in the above-identified patent and that said Letters Patent is hereby corrected as shown below:

Column 32, line 6, "47.3080" should be --47.8080--.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO.      : 7,576,147 B2
APPLICATION NO. : 11/212241
DATED           : August 18, 2009
INVENTOR(S)     : Lawrence T. Drzal et al.

It is certified that error appears in the above-identified patent and that said Letters Patent is hereby corrected as shown below:

In the Specification

In column 1, line 18, please delete:

"Not Applicable"

and insert:

-- This invention was made with government support under 2001-35504-10734 awarded by the United States Department of Agriculture. The government has certain rights in the invention. --

Signed and Sealed this
Twenty-fifth Day of February, 2014

Michelle K. Lee
*Deputy Director of the United States Patent and Trademark Office*